(12) United States Patent
Shimizu et al.

(10) Patent No.: US 11,579,497 B2
(45) Date of Patent: Feb. 14, 2023

(54) SUBSTRATE FOR DISPLAY DEVICE AND DISPLAY DEVICE

(71) Applicant: SHARP KABUSHIKI KAISHA, Sakai (JP)

(72) Inventors: Yukio Shimizu, Sakai (JP); Shinzoh Murakami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 49 days.

(21) Appl. No.: 17/155,994

(22) Filed: Jan. 22, 2021

(65) Prior Publication Data

US 2021/0247641 A1 Aug. 12, 2021

Related U.S. Application Data

(60) Provisional application No. 62/971,762, filed on Feb. 7, 2020.

(51) Int. Cl.
*G09G 3/36* (2006.01)
*G02F 1/1345* (2006.01)

(52) U.S. Cl.
CPC ....... *G02F 1/13452* (2013.01); *G09G 3/3677* (2013.01); *G09G 3/3688* (2013.01); *G09G 2330/021* (2013.01)

(58) Field of Classification Search
CPC ........... G02F 1/13629; G02F 1/133334; G02F 1/133345; G02F 1/1345; G02F 1/13452; G02F 1/13458; G06F 2203/04107; G06F 3/046; H01L 2924/3025; H01L 2224/73265; H05K 1/189; H05K 1/0218; H05K 3/323; H05K 1/0259; H05K 2201/05; H05K 1/0219; G09G 2330/021; G09G 3/035; G09G 3/3677; G09G 3/3688
See application file for complete search history.

(56) References Cited

U.S. PATENT DOCUMENTS

| | | | |
|---|---|---|---|
| 8,450,753 B2 * | 5/2013 | Shiota | G02F 1/13452 |
| | | | 257/678 |
| 2006/0012745 A1 * | 1/2006 | Kobayashi | G02F 1/13452 |
| | | | 349/152 |
| 2011/0075088 A1 | 3/2011 | Matsui et al. | |

(Continued)

FOREIGN PATENT DOCUMENTS

| | | | | |
|---|---|---|---|---|
| JP | 2009192976 A | * | 8/2009 | G09F 9/00 |
| JP | 5226070 B2 | | 7/2013 | |

*Primary Examiner* — Duc Q Dinh
(74) *Attorney, Agent, or Firm* — ScienBiziP, P.C.

(57) ABSTRACT

A substrate for a display includes a substrate section on which a flexible substrate and a driver are mounted, a flexible substrate side terminal area, disposed in a mounting area on the substrate section for the flexible substrate, to which a signal is inputted from the flexible substrate, a driver side terminal area, disposed in a mounting area on the substrate section for the driver, through which at least a part of the signal is inputted and outputted to the driver, a wire, disposed to extend from the mounting area on the substrate section for the flexible substrate to the mounting area for the driver and connected to the flexible substrate side terminal area and the driver side terminal area, through which the signal is transmitted, and a shield section, disposed to overlap the wire via an insulating film on the substrate section, that is kept at a constant potential.

18 Claims, 20 Drawing Sheets

(56) References Cited

U.S. PATENT DOCUMENTS

2013/0207933 A1* 8/2013 Mamba ................ G06F 3/046
                                                         345/174
2018/0364514 A1* 12/2018 Liu ..................... G09G 3/3674
2018/0374913 A1* 12/2018 Aota ................ G02F 1/136286
2020/0196496 A1* 6/2020 Shin .................... H05K 9/0054

* cited by examiner

FIG.2
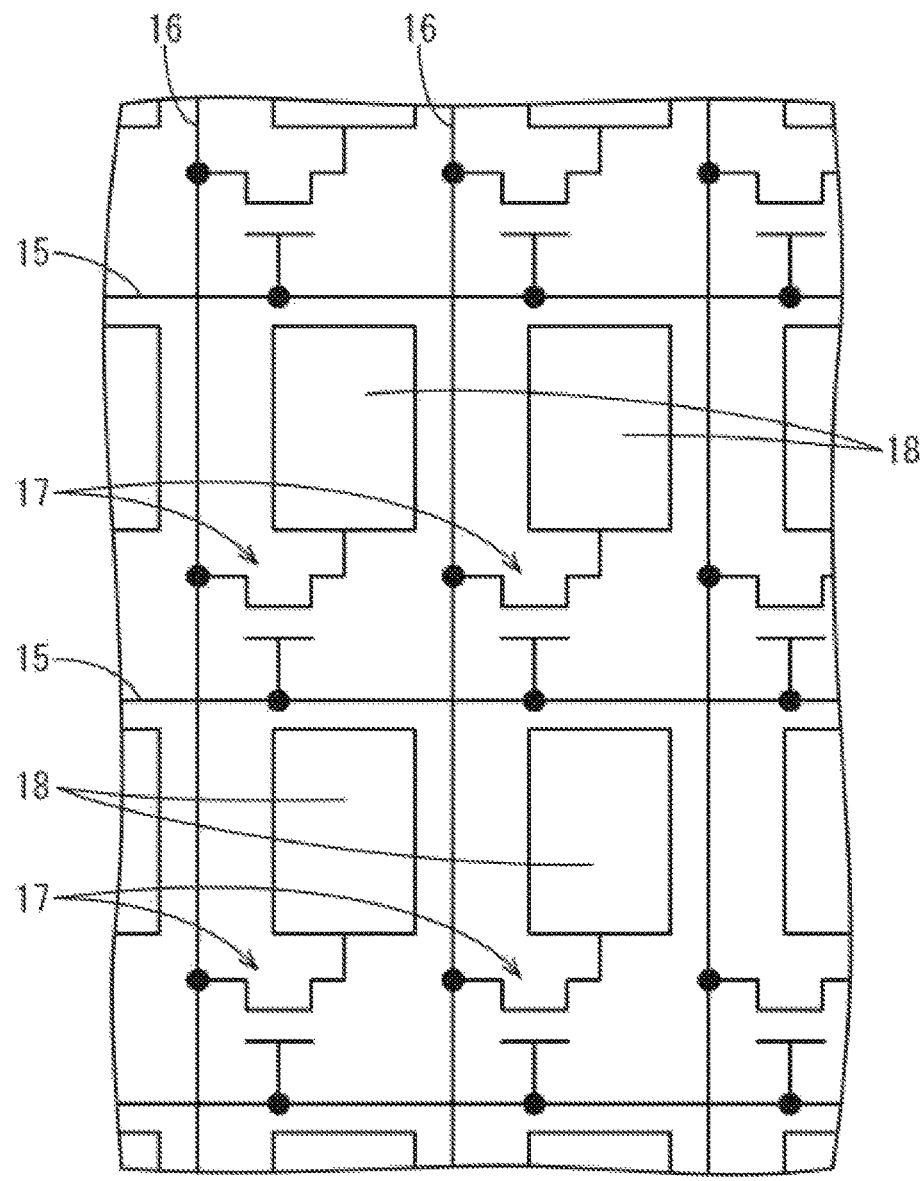
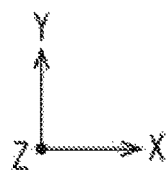

SUBSTRATE FOR DISPLAY DEVICE AND DISPLAY DEVICE

TECHNICAL FIELD

The technology disclosed herein relates to a substrate for a display device and a display device.

BACKGROUND ART

Conventionally, a known example of a circuit board constituting a display device has been described in PTL listed below. The circuit board described in PTL 1 includes pads arranged in a plurality of columns. The pads include a first column of pads to which long metal wires extend and a second column of pads to which metal wires that are shorter than the first metal wires, which extend to the first column of pads, extend. The first metal wires are provided not in a region between adjacent second columns of pads but in a region at a lower layer than the second column of pads via at least a first insulating layer between the first metal wires and the second column of pads. Assuming that W1 is the line width of a first metal wire in a region at a lower layer than a second column of pads and W2 is the width of a second column of pads, $0.8 \leq W1/W2 \leq 1$.

CITATION LIST

Patent Literature

PTL 1: Japanese Patent No. 5226070

SUMMARY OF DISCLOSURE

Technical Problem

The circuit board described in PTL 1 listed above makes it hard for a leak defect to occur and achieves narrowing of pitches between pads. Meanwhile, in addition to being mounted with a drive IC that is connected to each pad, the circuit board is mounted with a flexible substrate connected to an external signal supply source, and has a wire routed from a mounting area for the flexible substrate to a mounting area for the drive IC. This wire serves to transmit, to the drive IC, a signal supplied by the flexible substrate. Note here that in a case where the circuit board is made higher in definition or the drive IC is driven at a high speed, a signal being transmitted through the wire tends to be easily affected by external noise, with the result that there has been a risk that blunting may occur in the signal in the process of transmission.

The technology described herein was made under such circumstances, and has as an object to reduce signal blunting.

Solution to Problem (1) According to the technology described herein, a substrate for a display device includes a substrate section on which a flexible substrate and a driver are mounted, a flexible substrate side terminal area, disposed in a mounting area on the substrate section for the flexible substrate, to which a signal is inputted from the flexible substrate, a driver side terminal area, disposed in a mounting area on the substrate section for the driver, through which at least a part of the signal is inputted and outputted to the driver, a wire, disposed to extend from the mounting area on the substrate section for the flexible substrate to the mounting area for the driver and connected to the flexible substrate side terminal area and the driver side terminal area, through which the signal is transmitted, and a shield section, disposed to overlap the wire via an insulating film on the substrate section, that is kept at a constant potential.

(2) Further, in addition to (1) described above, the substrate may further include a constant-potential wire, disposed to extend from the mounting area on the substrate section for the flexible substrate to the mounting area for the driver, that is kept at a constant potential. The driver side terminal area may include a constant-potential driver side terminal area connected to the constant-potential wire, and the shield section may be connected to the constant-potential driver side terminal area.

(3) Further, in the substrate, in addition to (2) described above, the constant-potential wire may be placed at the same layer as the wire, and the shield section may be disposed to overlap both the wire and the constant-potential wire via an insulating film.

(4) Further, in the substrate, in addition to (3) described above, whereas the wire includes an electrical power system wire through which an electrical power system signal may be transmitted as the signal and a control system wire through which a control system signal is transmitted as the signal, the constant-potential wire may be placed adjacent to the electrical power system wire at a spacing from the electrical power system wire, and the shield section may be disposed to overlap at least both the electrical power system wire and the constant-potential wire via an insulating film.

(5) Further, in the substrate, in addition to any of (1) to (4) described above, the wire may include a first wire and a second wire disposed to overlap the first wire via an insulating film, and the shield section may be disposed to overlap both the first wire and the second wire via an insulating film.

(6) Further, in the substrate, in addition to any of (1) to (5) described above, the wire may include an electrical power system wire through which an electrical power system signal is transmitted as the signal and a control system wire through which a control system signal is transmitted as the signal, and the shield section may be disposed to overlap both the electrical power system wire and the control system wire via an insulating film.

(7) Further, in the substrate, in addition to any of (1) to (5) described above, the wire may include an electrical power system wire through which an electrical power system signal is transmitted as the signal and a control system wire through which a control system signal is transmitted as the signal, and the shield section may include an electrical power system shield section disposed to overlap the electrical power system wire via an insulating film and a control system shield section disposed to overlap the control system wire via the insulating film and separated from the electrical power system shield section.

(8) Further, in the substrate, in addition to (7) described above, the electrical power system wire and the control system wire may be placed at the same layer as each other, and the control system shield section may be located closer to the control system wire in a direction of overlap than the electrical power system shield section is located in relation to the electrical power system wire in the direction of overlap.

(9) Further, in the substrate, in addition to any of (1) to (8) described above, the substrate section may include a driver overlap wire placed at the same layer as the wire, disposed to overlap the driver, and connected to the driver side terminal area, and the shield section may be disposed to overlap both the wire and the driver overlap wire via an insulating film.

(10) Further, in the substrate, in addition to any of (1) to (9) described above, the substrate section may be mounted with a gate driver that, as the driver, outputs at least a scanning signal by processing the signal and a source driver that, as the driver, outputs at least an image signal by processing the signal, the driver side terminal area may include a gate driver side terminal area disposed in a mounting area for the gate driver and a source driver side terminal area disposed in a mounting area for the source driver, the wire may include a gate driver side wire disposed to extend from the mounting area for the flexible substrate to the mounting area for the gate driver and connected to the flexible substrate side terminal area and the gate driver side terminal area and a source driver side wire disposed to extend from the mounting area for the flexible substrate to the mounting area for the source driver and connected to the flexible substrate side terminal area and the source driver side terminal area, and the shield section may include a gate driver side shield section disposed to overlap the gate driver side wire via an insulating film and the source driver shield section disposed to overlap the source driver side wire via an insulating film.

(11) Further, in the substrate, in addition to any of (1) to (10) described above, the substrate section may be mounted with a plurality of the drivers located at a spacing from each other, and may include an inter-driver wire disposed to pass transversely across a space between mounting areas on the substrate section for the drivers that are adjacent to each other and connected to a driver side terminal area disposed in each of the mounting areas for the drivers that are adjacent to each other and an inter-driver shield section, disposed over the glass substrate to overlap the inter-driver wire via an insulating film, that is kept at a constant potential.

(12) According to the technology described herein, a display device includes the substrate of any of (1) to (11) described above and a counter substrate placed opposite the substrate.

Advantageous Effects of Disclosure

The technology described herein makes it possible to reduce signal blunting.

BRIEF DESCRIPTION OF DRAWINGS

FIG. 2 is a circuit diagram showing an array of pixels in a display area of the liquid crystal panel.

DESCRIPTION OF EMBODIMENTS

Embodiment 1

Figure 1:
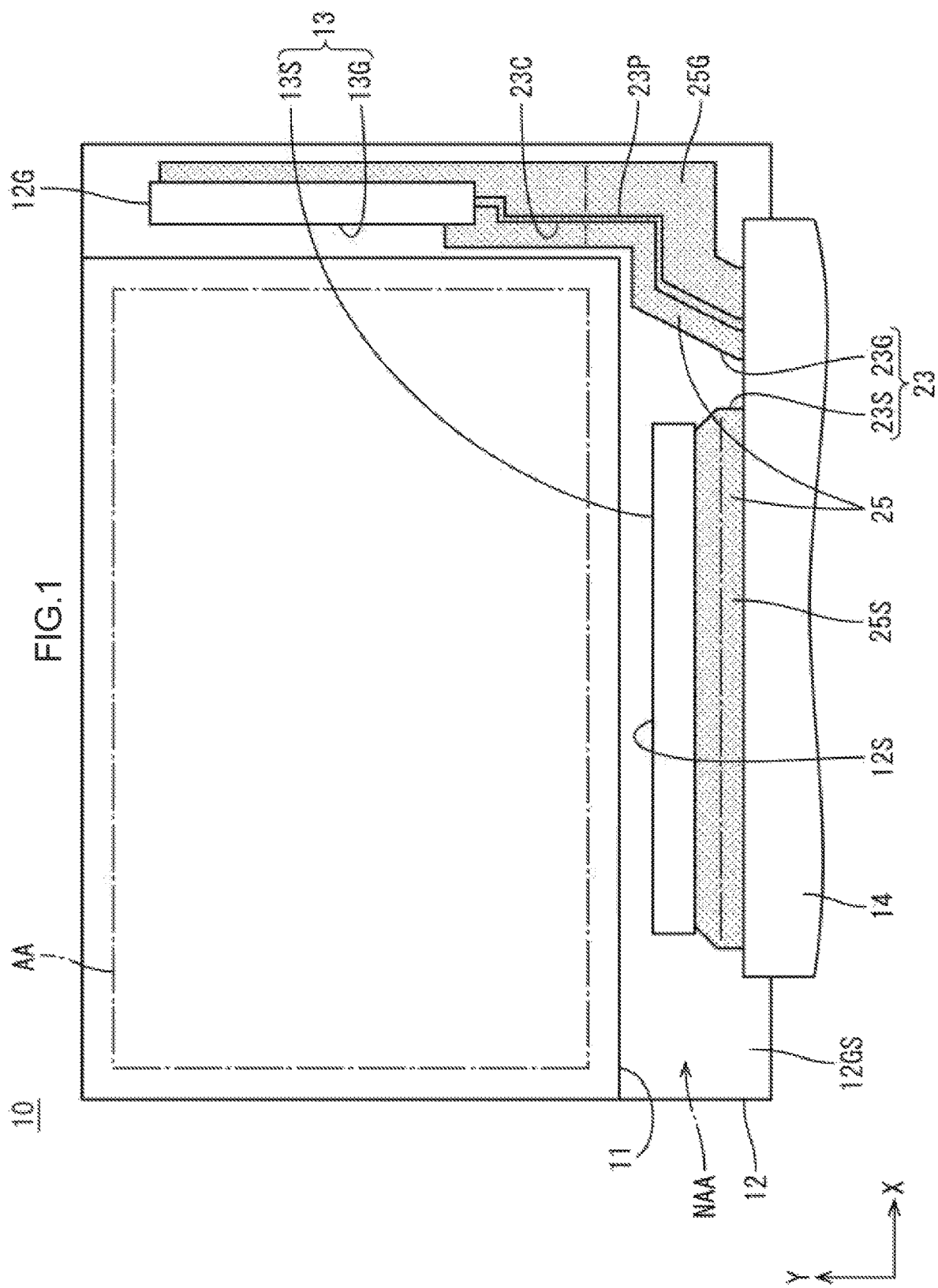
FIG. 1 is a plan view of a liquid crystal panel according to Embodiment 1.

Embodiment 1 is described with reference to FIGS. 1 to 7. The present embodiment illustrates a liquid crystal panel (display device) 10. It should be noted that some of the drawings show an X axis, a Y axis, and a Z axis, and are drawn such that each of the axes extends in a corresponding one of the directions shown in the drawings.

FIG. 1 is a plan view of the liquid crystal panel 10. According to the present embodiment, as shown in FIG. 1, the liquid crystal panel 10 is horizontally long square in planar shape as a whole. This liquid crystal panel 10 has its long-side direction, short-side direction, and board thickness direction corresponding to an X-axis direction, a Y-axis direction, and a Z-axis direction, respectively. The liquid crystal panel 10 is configured to display an image by utilizing illuminating light that is emitted from a backlight device (lighting device). In the liquid crystal panel 10, a portion of a screen that is located at the center serves a display area AA where an image is displayed, and a frame-shaped outer peripheral portion of the screen that surrounds the display area AA serves as a non-display area NAA (frame area) where no image is displayed. It should be noted that the display area AA is an area surrounded by dot-and-dash lines in FIG. 1.

As shown in FIG. 1, the liquid crystal panel 10 is configured such that a liquid crystal layer containing liquid crystal molecules constituting a substance whose optical properties vary in the presence of the application of an electric field is sandwiched between a pair of substrates 11 and 12 made of substantially transparent and highly translucent glass. One of the pair of substrates 11 and 12 that is situated toward the front is a CF substrate (counter substrate) 11, and one of the pair of substrates 11 and 12 that is situated toward the back is an array substrate (substrate for a display device, active matrix substrate) 12. The array substrate 12 includes a glass substrate (substrate section) 12GS and various types of film stacked in layers on the inside of the glass substrate 12GS. In this regard, the CF substrate 11 is similar to the array substrate 12. The array substrate 12 is larger in both long-side dimension and short-side dimension than the CF substrate 11, and one end of the array substrate 12 in the long-side direction and one end of the array substrate 12 in the short-side direction do not overlap one end of the CF substrate 11 in the long-side direction and one end of the CF substrate 11 in the short-side direction, respectively, and in the non-overlap area, a driver 13 and a flexible substrate 14 are mounted. The driver 13 is composed of an LSI chip having a drive circuit inside, mounted on the glass substrate 12GS of the array substrate 12 by COG (chip on glass), and serves to process various types of signal that are transmitted by the flexible substrate 14. The flexible substrate 14 includes a substrate composed of an insulating and flexible synthetic resin material (such as polyimide resin), and has a large number of wiring patterns over the substrate. An end of the substrate of the flexible substrate 14 is mounted on the glass substrate 12GS of the array substrate 12 by FOG (film on glass), and the flexible substrate 14 serves to transmit, to the liquid crystal panel 10, a signal that is outputted from an external signal supply source.

As shown in FIG. 1, the driver 13 includes one gate driver 13G mounted at one short-side (in FIG. 1, right-side) end of the array substrate 12 and one source driver 13S mounted at one long-side (in FIG. 1, lower-side) end. Whereas the gate driver 13G has a vertically long shape that extends along the Y-axis direction, the source driver 13S has a horizontally long shape that extends along the X-axis direction. The flexible substrate 14 is mounted in a location at one long-side end of the array substrate 12 opposite to the source driver 13S across the display area AA in the Y-axis direction. Accordingly, the source driver 13S is placed at spacings from the flexible substrate 14 and the display area AA in the Y-axis direction so as to be interposed between the flexible substrate 14 and the display area AA. Further, as will be described in detail later, the array substrate 12 is provided with a wire 23 routed from the flexible substrate 14 to each of the drivers 13G and 13S. It should be noted that FIG. 1 uses half-tone dot meshing to illustrate a range of formation of the after-mentioned shield section 25.

As shown in FIG. 2, on the inside of the glass substrate 12GS of the array substrate 12 in the display area AA, large numbers of gate lines (scanning lines) 15 and source lines (signal lines, data lines) 16 are arranged in gridlike fashion, and near intersections between the gate lines 15 and the source lines 16, TFTs 17, which serve as switching elements, and pixel electrodes 18 are provided. FIG. 2 is a circuit diagram showing an array of pixels in the display area AA of the array substrate 12. Whereas the gate lines 15 are connected to gate electrodes of the TFTs 17 by extending along the X-axis direction in such a manner as to pass transversely across the display area AA, the source lines 16 are connected to source electrodes of the TFTs 17 by extending along the Y-axis direction in such a manner as to pass longitudinally across the display area AA. Whereas a plurality of the gate lines 15 are placed at spacings along the Y-axis direction, a plurality of the source lines 16 are placed at spacings along the X-axis direction. A plurality of the TFTs 17 and a plurality of the pixel electrodes 18 are planarly arranged in a matrix (rows and columns) by being regularly arranged along the X-axis direction and the Y-axis direction, and the pixel electrodes 18 are connected to drain electrodes of the TFTs 17. The TFTs 17 are driven in accordance with scanning signals that are supplied to the gate lines 15 by the already-described gate driver 13G (see FIG. 1), and accordingly, the pixel electrodes 18 are charged with potentials based on image signals (data signals) that are supplied to the source lines 16 by the already-described source driver 13S (see FIG. 1). On the other hand, on the inside of the CF substrate 11 in the display area AA, there are provided color filters of three colors, disposed to overlap each separate pixel electrode 18, that exhibit red (R), green (G), and blue (B), a light shielding section (black matrix) that partitions adjacent color filters from each other, and the like. In this liquid crystal panel 10, R, G, and B color filters arranged along the X-axis direction and three pixel electrodes 18 facing the color filters constitute pixels of three colors, respectively. The pixels are arrayed at predetermined array pitches in the X-axis direction and the Y-axis direction. Further, either the CF substrate 11 or the array substrate 12 is provided with a common electrode, composed of the same transparent electrode material as the pixel electrodes 18, that is disposed to overlap the pixel electrodes 18 at spacings in the Z-axis direction. The liquid crystal panel 10 enables each pixel to perform a predetermined tone display in accordance with a predetermined electric field applied to the liquid crystal layer on the basis of a potential difference between this common electrode and a corresponding one of the pixel electrodes 18.

Figure 3:
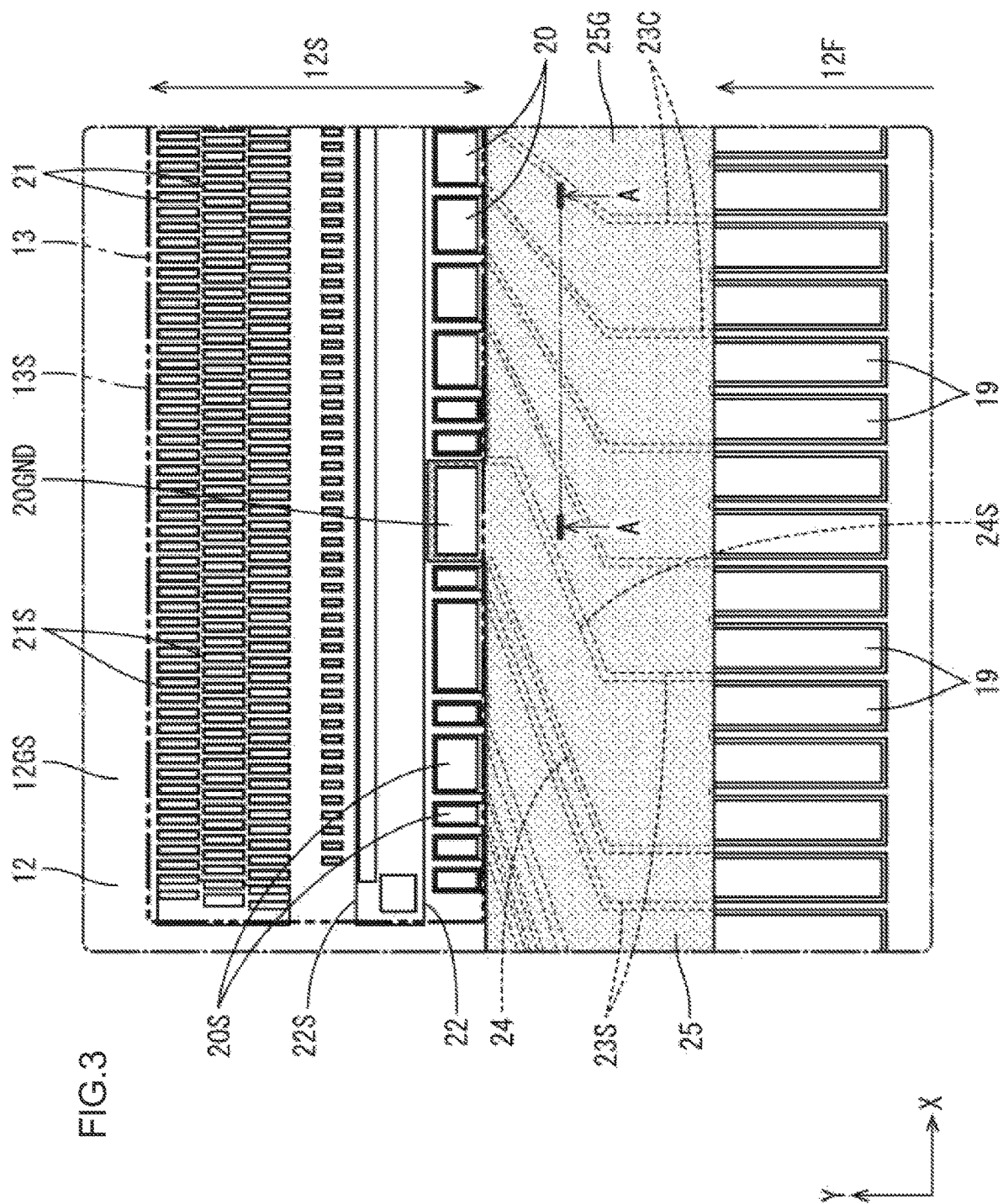
FIG. 3 is a plan view of an array substrate of the liquid crystal panel in and near mounting areas for a source driver and a flexible substrate.
Figure 4:
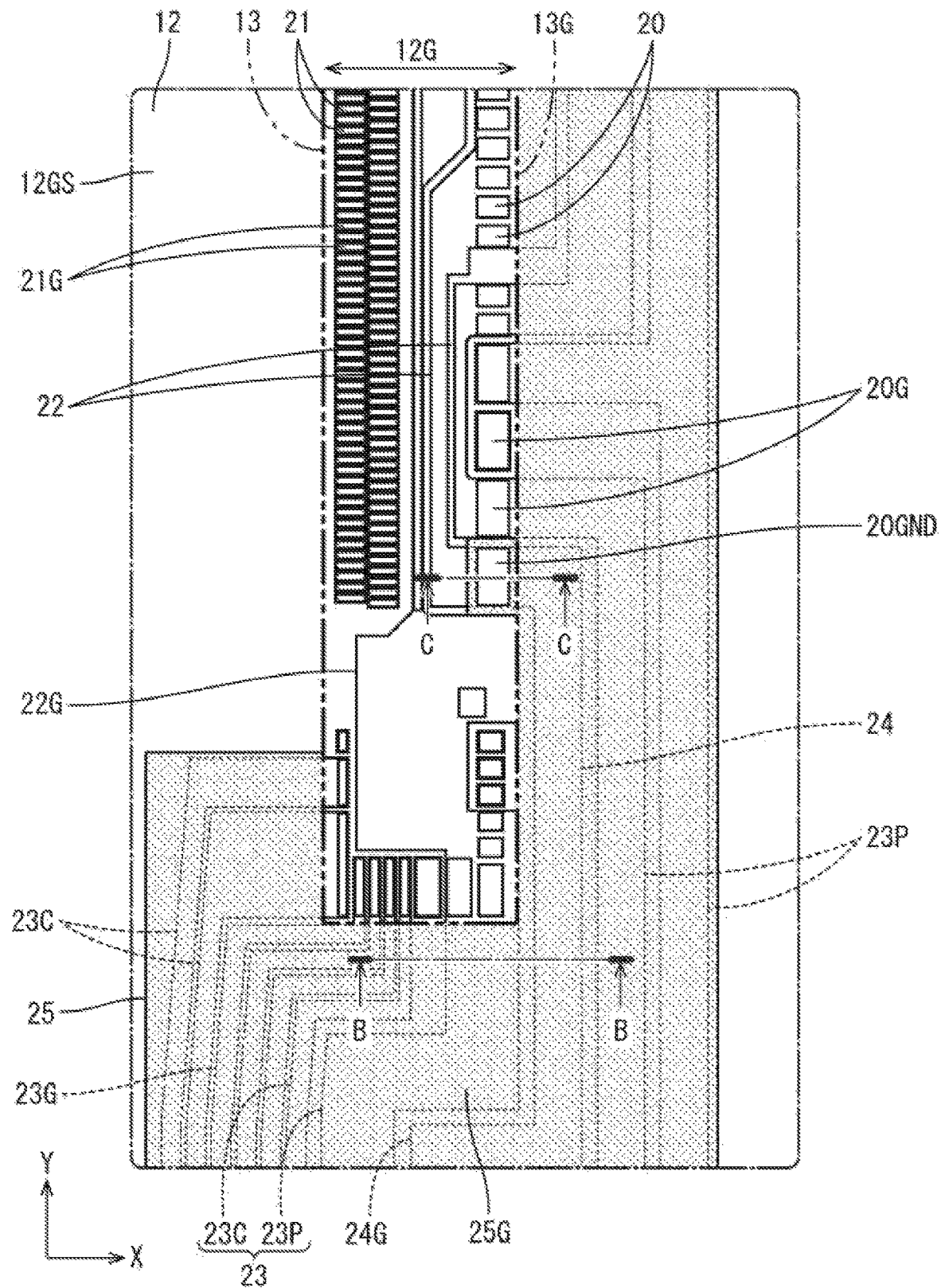
FIG. 4 is a plan view of the array substrate in and near a mounting area for a gate driver.

Next, a configuration of each of the drivers 13G and 13S and the flexible substrate 14 in mounting areas 12F, 12G, and 12S of the glass substrate 12GS of the array substrate 12 in the non-display area NAA is described as appropriate with reference of FIGS. 3 and 4. FIG. 3 is a plan view of the array substrate 12 in and near the mounting areas 12F and 12S for the source driver 13S and the flexible substrate 14. It should be noted that FIG. 3 uses chain double-dashed lines to illustrate the source driver 13S, the flexible substrate 14, and the mounting areas 12F and 12S therefor. FIG. 4 is a plan view of the array substrate 12 in and near the mounting area 12G for the gate driver 13G. It should be noted that FIG. 4 uses chain double-dashed lines to illustrate the gate driver 13G and the mounting area 12G therefor. In the mounting area 12F on the glass substrate 12GS of the array substrate 12 for the flexible substrate 14, as shown in FIG. 3, there are provided a plurality of flexible substrate side terminal areas 19 through which to be supplied with signals from the flexible substrate 14. Each of the flexible substrate side terminal areas 19 has a horizontally long square shape when seen in plan view, and a plurality of the flexible substrate side terminal areas 19 are arranged at spacings along the X-axis direction (i.e. a direction of extension of the mounting area 12F for the flexible substrate 14). With an anisotropic conductive film (ACF) sandwiched between the mounting area 12F on the glass substrate 12GS of the array substrate 12 for the flexible substrate 14 and the flexible substrate 14, the flexible substrate side terminal areas 19 and terminals at the flexible substrate 14 are electrically connected to each other via conducting particles contained in the anisotropic conductive film.

In the mounting areas 12G and 12S on the glass substrate 12GS of the array substrate 12 for the gate driver 13G and the source driver 13S, as shown in FIGS. 3 and 4, there are provided a plurality of driver side input terminal areas (driver side terminal areas) 20 through which to input signals to the respective drivers 13G and 13S, a plurality of driver side output terminal areas 21 through which to receive signals outputted from the respective drivers 13G and 13S, and a driver overlap wire 22 disposed to overlap each of the drivers 13G and 13S when seen in plan view. The driver side input terminal areas 20 include a plurality of gate driver side input terminal areas (gate driver side terminal areas) 20G disposed in the mounting area 12G for the gate driver 13G and a plurality of source driver side input terminal areas (source driver side terminal areas) 20S disposed in the mounting area 12S for the source driver 13S. Similarly, the driver side output terminal areas 21 include a plurality of gate driver side output terminal areas 21G disposed in the mounting area 12G for the gate driver 13G and a plurality of source driver side output terminal areas 21S disposed in the mounting area 12S for the source driver 13S. Further, the driver overlap wire 22 includes a gate driver overlap wire 22G disposed to overlap the gate driver 13G and a source driver overlap wire 22S disposed to overlap the source driver 13S.

As shown in FIG. 3, the source driver side input terminal areas 20S and the source driver side output terminal areas 21S each have a square shape when seen in plan view, and a plurality of the source driver side input terminal areas 20S and a plurality of the source driver side output terminal areas 21S are arranged at spacings along the X-axis direction (i.e. a direction of extension of the mounting area 12S for the source driver 13S). The source driver side input terminal areas 20S are larger in plan view than the source driver side output terminal areas 213, and the number of source driver side input terminal areas 20S provided is smaller than the number of source driver side output terminal areas 20S provided. A group of a plurality of the source driver side input terminal areas 20S and a group of a plurality of the source driver side output terminal areas 21S each extend along the X-axis direction, and a spacing is provided between the groups in the Y-axis direction. In the spacing, the source driver overlap wire 22S is disposed. With an anisotropic conductive film sandwiched between the mounting area 12S on the glass substrate 12GS of the array substrate 12 for the source driver 13S and the source driver 13S, the source driver side input terminal areas 20S and the source driver side output terminal areas 21S are electrically connected to input terminals and output terminals at the source driver 13S via conducting particles contained in the anisotropic conductive film.

As shown in FIG. 4, the gate driver side input terminal areas 20G and the gate driver side output terminal areas 21G each have a square shape when seen in plan view, and a plurality of the gate driver side input terminal areas 20G and a plurality of the gate driver side output terminal areas 21G are arranged at spacings along the Y-axis direction (i.e. a direction of extension of the mounting area 12G for the gate driver 13G). The gate driver side input terminal areas 20G are larger in plan view than the gate driver side output terminal areas 21G, and the number of gate driver side input terminal areas 20G provided is smaller than the number of gate driver side output terminal areas 20G provided. A group of a plurality of the gate driver side input terminal areas 20G and a group of a plurality of the gate driver side output terminal areas 21G each extend along the Y-axis direction, and a spacing is provided between the groups in the X-axis direction. In the spacing, the gate driver overlap wire 22G is disposed. With an anisotropic conductive film sandwiched between the mounting area 12G on the glass substrate 12GS of the array substrate 12 for the gate driver 13G and the gate driver 13G, the gate driver side input terminal areas 20G and the gate driver side output terminal areas 21G are electrically connected to input terminals and output terminals at the gate driver 13G via conducting particles contained in the anisotropic conductive film.

On the glass substrate 12GS of the array substrate 12, as shown in FIGS. 3 and 4, a plurality of the wires 23 are routed from the mounting area 12F for the flexible substrate 14 to the mounting areas 12G and 12S for the respective drivers 13G and 13S. The wires 23 have their first and second ends connected to the flexible substrate side terminal areas 19 and the driver side input terminal areas 20, respectively, and serve to transmit, to the driver side input terminal areas 20, signals inputted to the flexible substrate side terminal areas 19 by the flexible substrate 14. The term "signals" here refers to signals whose potentials may fluctuate over time, and encompasses control system signals and electrical power system signals. The wires 23 include a plurality of gate driver side wires 23G connected to the flexible substrate side terminal areas 19 and the gate driver side input terminal areas 20G and a plurality of source driver side wires 23S connected to the flexible substrate side terminal areas 19 and the source driver side input terminal areas 20S. The gate driver side wires 23G and the source driver side wires 23S include a plurality of control system wires 23C through which to transmit control system signals as the signals and a plurality of electrical power system wires 23P through which to transmit electrical power system signals as the signals. The electrical power system wires 23P are in general larger in line width than the control system wires 23C. Further, digital signals are transmitted as the control system signals to the control system wires 23C, and analog signals are transmitted as the electrical power system signals to the electrical power system wires 23P. Whereas the control system wires 23C included in the gate driver side wires 23G are placed in a concentrated manner on the left side of FIG. 4 with respect to the gate driver 13G, the electrical power system wires 23P are placed in a concentrated manner on the right side of FIG. 4 with respect to the gate driver 13G. It should be noted that on account of limited space, FIG. 3 illustrates only the control system wires 23C of the control system wires 23C and electrical power system wires 23P included in the source driver side wires 23S.

On the glass substrate 12GS of the array substrate 12, as shown in FIGS. 3 and 4, a ground wire (constant-potential wire) 24 is routed from the mounting area 12F for the flexible substrate 14 to the mounting areas 12G and 12S for the respective drivers 13G and 13S separately from the wires 23 described above. The ground wire 24 has its first and second ends connected to the flexible substrate side terminal areas 19 and the driver side input terminal areas 20, respectively, and serves to transmit, to the driver side input terminal areas 20, a ground potential signal inputted to the flexible substrate side terminal areas 19 by the flexible substrate 14. This ground potential signal is a type of constant-potential signal. The term "constant-potential signal" here refers to a signal whose potential hardly fluctuates over time and is substantially constant, and this signal is different in type from the signals that are transmitted through the already-described wires 23. It should be noted that the driver side input terminal areas 20 include grounding driver side input terminal areas (constant-potential driver side terminal areas) 20GND that are connected to the ground wire 24. The ground wire 24 includes a gate driver side ground wire 24G connected to the flexible substrate side input terminal areas 19 and a grounding driver side input terminal area 20GND included in the gate driver side input terminal areas 20G and a source driver side ground wire 24S connected to the flexible substrate side input terminal areas 19 and a grounding driver side input terminal area 20GND included in the source driver side input terminal areas 20S. The ground wire 24 is formed on the glass substrate 12GS to be routed in such a manner as to run parallel to the aforementioned wires 23. In particular, the gate driver side ground wire 24G extends in such a manner as to run parallel to the electrical power system wires 23P included in the gate driver side wires 23G, and is interposed between electrical power system wires 23P on both sides. The gate driver side ground wire 24G avoids a short circuit by being placed at spacings from the adjacent electrical power system wires 23P. The source driver side ground wire 24S extends in such a manner as to run parallel to the control system wires 23C included in the source driver side wires 23S, and is interposed between control system wires 23C on both sides. The source driver side ground wire 24S avoids a short circuit by being placed at spacings from the adjacent control system wires 23C.

Figure 5:
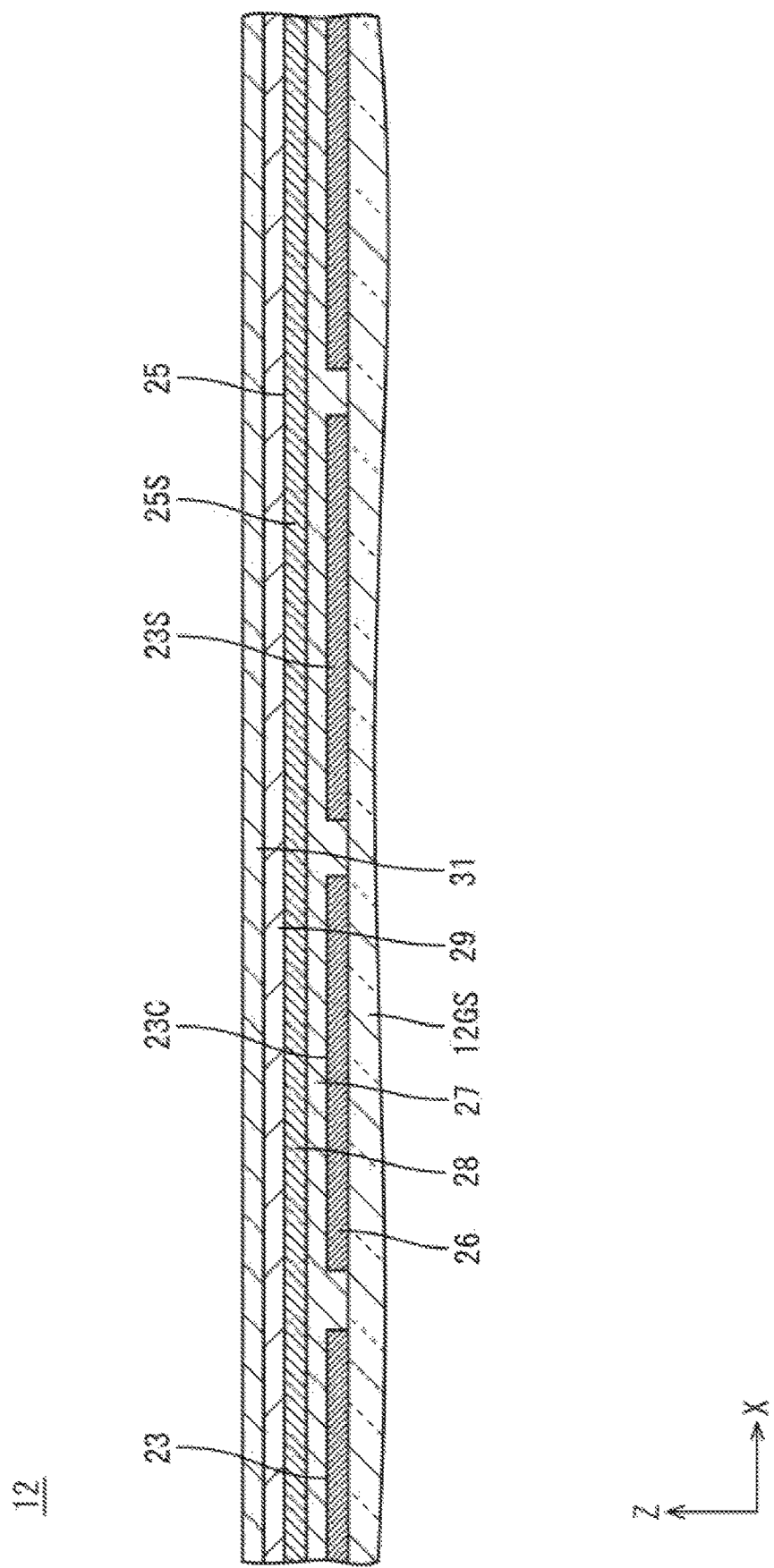
FIG. 5 is a cross-sectional view of the array substrate as taken along line A-A in FIG. 3.
Figure 6:
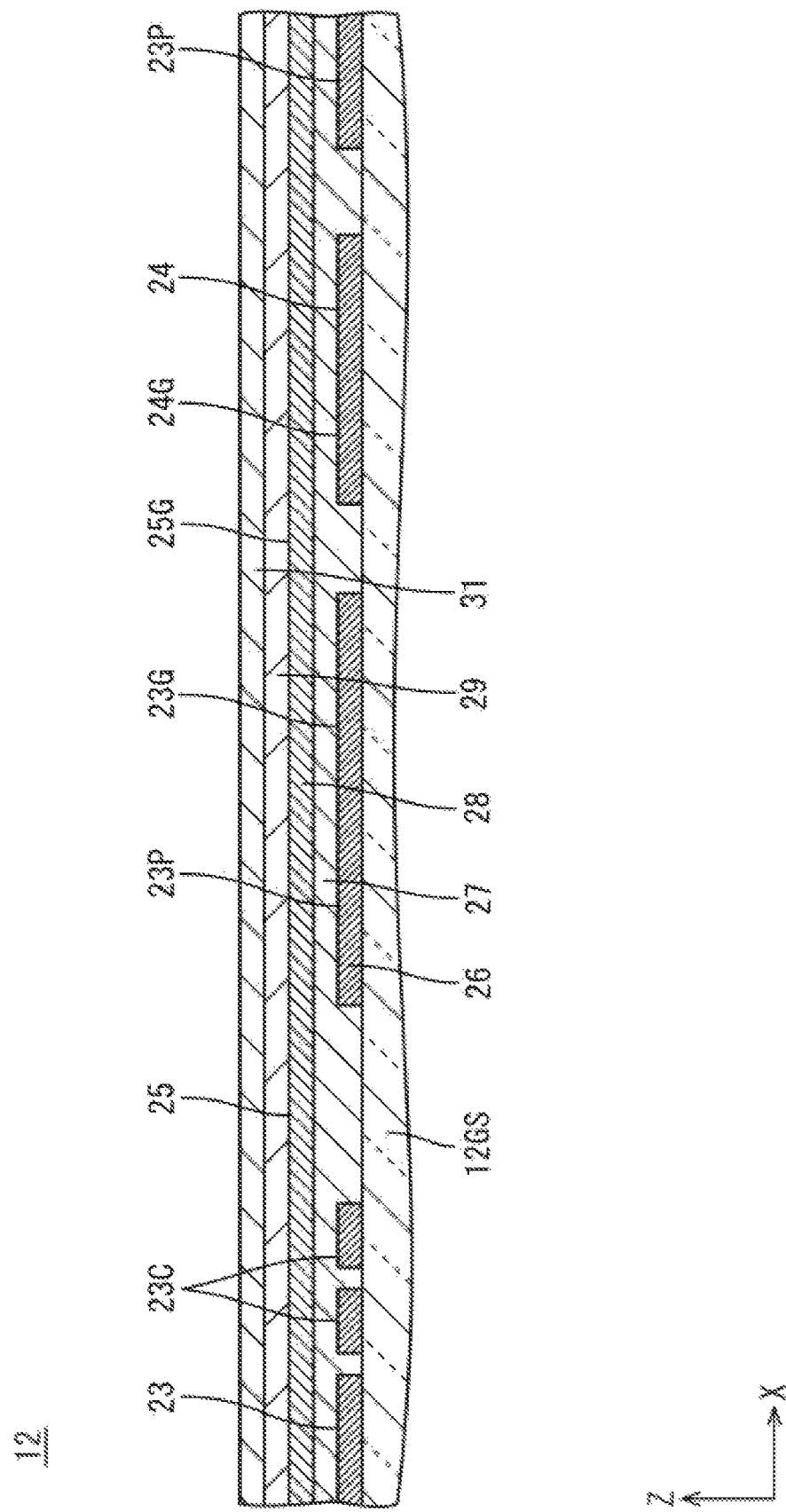
FIG. 6 is a cross-sectional view of the array substrate as taken along line B-B in FIG. 4.
Figure 7:
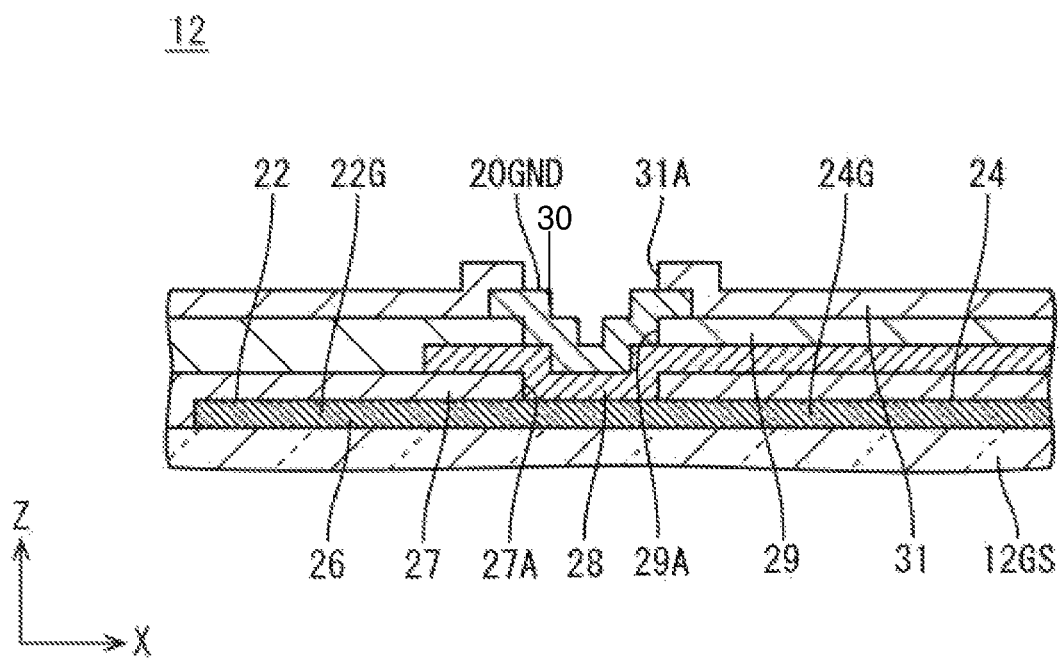
FIG. 7 is a cross-sectional view of the array substrate as taken along line C-C in FIG. 4.

Incidentally, the glass substrate 12GS of the array substrate 12 according to the present embodiment is provided with a shield section 25 for shielding the aforementioned wires 23. The following describes a configuration of the shield section 25 as appropriate with reference to FIGS. 5 to 7 in addition to FIGS. 1, 3, and 4. FIG. 5 is a cross-sectional view of a source driver side wire 23S and the shield section 25 (i.e. the after-mentioned source driver side shield section 25S) in the array substrate 12. FIG. 6 is a cross-sectional view of a gate driver side wire 23G and the shield section 25 (i.e. the after-mentioned gate driver side shield section 25G) in the array substrate 12. FIG. 7 is a cross-sectional view of the array substrate 12 in and near a grounding driver side input terminal area 20GND. It should be noted that FIGS. 1, 3, and 4 use half-tone dot meshing to illustrate the range of formation of the shield section 25.

As shown in FIGS. 5 and 6, the shield section 25 is kept insulated from the wires 23 by being disposed to at least partially overlap the wires 23 via a first insulating film (insulating film) 27. Moreover, the shield section 25 is kept at a constant potential. Such a configuration, in which the wires 23 are shielded by the shield section 25, makes it hard for external noise to affect signals being transmitted through the wires 23. Such a configuration also makes it hard for noise generated from the wires 23 to affect the outside. This makes it hard for blunting to occur in the signals being transmitted through the wires 23 from the flexible substrate side terminal areas 19 to the driver side input terminal areas 20, and is therefore suitable to a further increase in definition of the array substrate 12 and a further increase in speed at which the driver 13 is driven. Note here that for example in a case where such a configuration is adopted that a driver is mounted on a TAB tape by COF (chip on film), the TAB tape is mounted on the glass substrate 12GS by FOG, and terminals of the TAB tape are connected to driver side input terminal areas, wires on the TAB tapes are no longer shielded, even if wires are shielded by a shield section. In that respect, the driver 13 according to the present embodiment is mounted on the glass substrate 12GS by COG and supplied with signals through the driver side input terminal areas 20 disposed in the mounting areas 12G and 12S therefor. The shielding by the shield section 25 of the wires 23 connected to the driver side input terminal areas 20 means that paths of transmission of signals that are inputted to the driver 13 are evenly shielded. This makes it harder for blunting to occur in the signals being transmitted through the wires 23. This brings about improvement in display quality of an image that is displayed in the display area AA of the liquid crystal panel 10.

Various types of film that are stacked over the glass substrate 12GS in the array substrate 12 are described in detail here. Over the glass substrate 12GS of the array substrate 12, as shown in FIGS. 5 to 7, at least a first metal film 26, the first insulating film (insulating film) 27, a semiconductor film, a second metal film 28, a second insulating film (insulating film) 29, a transparent electrode film 30, a third insulating film (insulating film) 31 are stacked in layers in this order starting from a lower layer side (glass substrate 12GS side). It should be noted that another film may be further stacked at a higher layer than the third insulating film 31. The first metal film 26 and the second metal film 28 are each made of a single-layer film composed of one type of metal material selected from among copper, titanium, aluminum, molybdenum, tungsten, and the like or a laminated film or alloy composed of different types of metal material, and have electrical conductivity. The first insulating film 27, the second insulating film 29, and the third insulating film 31 are each composed of an inorganic material such as silicon nitride ($SiN_x$) or silicon oxide ($SiO_2$) or an organic material such as PMMA (acrylic resin). The transparent electrode film 30 is composed of a transparent electrode material (such as ITO (indium tin oxide) or IZO (indium zinc oxide)). Further, the semiconductor film is composed of a thin film made of a semiconductor material such as an oxide semiconductor or amorphous silicon, and constitutes, for example, channel sections of the TFTs 17 that are disposed in the display area AA (see FIG. 2).

As shown in FIGS. 5 and 6, the wires 23, which are shielded by the shield section 25, are composed of the first metal film 26. On the other hand, the shield section 25 is composed of the second metal film 28, which is disposed at a higher layer than the first metal film 26 via the first insulating film 27. Accordingly, even when the shield section 25 is planarly placed so as to at least partially overlap the wires 23, the first insulating film 27, which is sandwiched between the wires 23 and the shield section 25, prevents the shield section 25 from getting short-circuited with the wires 23. The ground wire 24 is composed of the same first metal film 26 as the wires 23, and is placed at the same layer as the wires 23. Moreover, the shield section 25 is disposed as a higher layer to overlap the ground wire 24 in addition to the wires 23 via the first insulating film 27. Such a configuration makes it possible to secure a wide range of formation of the shield section 25, thus achieving a smaller resistant distribution in the shield section 25.

As shown in FIG. 7, each of the terminal areas 19, 20, and 21 disposed in the respective mounting areas 12F, 12G, and 12S on the glass substrate 12GS of the array substrate 12 has a laminated structure of the first metal film 26, the second metal film 28, and the transparent electrode film 30. It should be noted that although FIG. 7 is a cross-sectional view pertaining to a grounding driver side input terminal area 20GND of the terminal areas 19, 20, and 21, each of the terminals areas 19, 20, and 21 other than the grounding driver side input terminal area 20GND has a similar structure. For this reason, the wires 23, which are composed of the first metal film 26, are directly joined and thereby electrically connected to portions of the respective terminal areas 19, 20, 21 that are composed of the first metal film 26. Portions of each of the terminal areas 19, 20, 21 that are composed of the first metal film 26 and the second metal film 27, respectively, are connected to each other through a first contact hole 27A bored through the first insulating film 27, which is sandwiched between the first metal film 26 and the second metal film 28. Similarly, portions of each of the terminal areas 19, 20, 21 that are composed of the second metal film 28 and the transparent electrode film 30, respectively, are connected to each other through a second contact hole 29A bored through the second insulating film 29, which is sandwiched between the second metal film 28 and the transparent electrode film 30. A portion of each of the terminal areas 19, 20, and 21 that is composed of the transparent electrode film 30 is connected to a corresponding terminal of the driver 13 or the flexible substrate 14, to which the terminal area is connected, through an opening 31A bored through the third insulating film 31, which is placed at a higher layer than the transparent electrode film 30.

Moreover, as shown in FIGS. 3, 4, and 7, the shield section 25 is connected to the grounding driver side input terminal area 20GND. That is, the shield section 25 has its range of formation set so that the shield section 25 selectively overlaps the grounding driver side input terminal area 20GND of the terminal areas 19, 20 and 21, whereby the shield section 25 is directly joined to a portion of the grounding driver side input terminal area 20GND that is composed of the second metal film 28. Accordingly, the shield section 25 is electrically connected to the ground wire 24 via the grounding driver side input terminal area 20GND and at the same potential as the ground wire 24. That is, the shield section 25 is kept at the same substantially constant ground potential as the ground wire 24 by utilizing the grounding driver side input terminal area 20GND, by which the driver 13 is supplied with the ground potential. This achieves a simpler structure than in a case where a structure through to connect the shield section 25 to the ground wire 24 is provided separately from the grounding driver side input terminal area 20GND.

Further, the driver overlap wire 22 is composed of the same first metal film 26 as the wires 23 and the ground wire 24, and is placed at the same layer as the wires 23 and the ground wire 24. In addition to constituting the terminal areas 19, 20, and 21, the driver overlap wire 22, the wires 23, and the ground wire 24, the first metal film 26 constitutes the gate lines 15 disposed in the display area AA, the gate electrodes of the TFTs 17, and the like (see FIG. 2). In addition to constituting the terminal areas 19, 20, and 21 and the shield section 25, the second metal film 28 constitutes the source lines 16 disposed in the display area AA, the source and drain electrodes of the TFTs 17, and the like (see FIG. 2). In addition to constituting the terminal areas 19, 20, and 21, the transparent electrode film 30 constitutes the pixel electrodes 18 disposed in the display area AA and the like (see FIG. 2).

As shown in FIGS. 1, 5, and 6, the shield section 25 includes a gate driver side shield section 25G disposed to overlap the gate driver side wires 23G and a source driver side shield section 25S disposed to overlap the source driver side wires 23S. As shown in FIGS. 1 and 5, the source driver side shield section 25S is formed in a range extending from the flexible substrate side terminal areas 19 to the source driver side input terminal areas 20S, as is the case with the source driver side wires 23S. As shown in FIGS. 1 and 6, the gate driver side shield section 25G is formed in a range extending from the flexible substrate side terminal areas 19 to the gate driver side input terminal areas 20G, as is the case with the gate driver side wires 23G. According to such a configuration, the shielding of the gate driver side wires 23G by the gate driver side shield section 25G and the shielding of the source driver side wires 23S by the source driver side shield section 25S make it hard for blunting to occur in signals being transmitted through the gate driver side wires 23G or the source driver side wires 23S. Note here that as compared with the gate driver 13G, the source driver 13S tends to process a larger number of signals along with an increase in definition of the array substrate 12 and, accordingly, tends to be driven at an increasingly higher speed. This is more suitable to achieving higher definition, as the source driver side shield section 25S makes it hard for blunting to occur in a signal that is inputted to the source driver 13S.

As shown in FIG. 3, the source driver side shield section 25S covers all source driver side wires 23S and source driver side ground wires 24S en bloc. That is, as shown in FIG. 5, the source driver side shield section 25S is laid astride the electrical power system wires 23P and control system wires 23C included in the source driver side wires 23S, and overlaps both the electrical power system wires 23P and the control system wires 23C via the first insulating film 27. Accordingly, as the electrical power system wires 23P and control system wires 23C included in the source driver side wires 23S are shielded en bloc by the source driver side shield section 25S, blunting hardly occurs in signals being transmitted through the electrical power system wires 23P or the control system wires 23C. Similarly, as shown in FIG. 4, the gate driver side shield section 25G covers all gate driver side wires 23G and gate driver side ground wires 24G en bloc. That is, as shown in FIG. 6, the gate driver side shield section 25G is laid astride the electrical power system wires 23P and control system wires 23C included in the gate driver side wires 23G, and overlaps both the electrical power system wires 23P and the control system wires 23C via the first insulating film 27. Accordingly, as the electrical power system wires 23P and control system wires 23C included in the gate driver side wires 23G are shielded en bloc by the gate driver side shield section 25G, blunting hardly occurs in signals being transmitted through the electrical power system wires 23P or the control system wires 23C. Such a configuration makes a resistance distribution smaller in each of the shield sections 25G and 25S than in a case where each of the shield sections 25G and 25S is divided into a shield section that overlaps the electrical power system wires 23P and a shield section that overlaps the control system wires 23C. In particular, as shown in FIG. 4, the gate driver side shield section 25G is laid astride the electrical power system wires 23P, which are larger in line width than the control system wires 23C, and the gate driver side ground wires 24G, which are adjacent to the electrical power system wires 23P, and overlap both the electrical power system wires 23P and the gate driver side ground wires 24G via the first insulating film 27. This secures a wider range of formation of the gate driver side shield section 25G. This makes it possible to achieve a smaller resistant distribution in the gate driver side shield section 25G.

As described above, an array substrate (substrate for a display device) 12 of the present embodiment includes a glass substrate (substrate section) 12GS on which a flexible substrate 14 and a driver 13 are mounted, a flexible substrate side terminal area 19, disposed in a mounting area 12F on the glass substrate 12GS for the flexible substrate 14, to which a signal is inputted from the flexible substrate 14, a driver side input terminal area (driver side terminal area) 20, disposed in a mounting area 12G or 12S on the glass substrate 12GS for the driver 13, through which at least a part of the signal is inputted and outputted to the driver 13, a wire 23, disposed to extend from the mounting area 12F on the glass substrate 12GS for the flexible substrate 14 to the mounting area 12G or 12S for the driver 13 and connected to the flexible substrate side terminal area 19 and the driver side input terminal area 20, through which the signal is transmitted, and a shield section 25, disposed to overlap the wire 23 via a first insulating film (insulating film) 27 on the glass substrate 12GS, that is kept at a constant potential.

In this way, upon being inputted to the flexible substrate side terminal area 19, a signal that is transmitted by the flexible substrate 14 is transmitted to the driver side input terminal area 20 through the wire 23, and at least a part of the signal is inputted to the driver 13. In the driver 13, at least the part of the signal thus inputted is processed. The wire 23 is disposed to extend from the mounting area 12F on the glass substrate 12GS for the flexible substrate 14 to the mounting area 12G or 12S for the driver 13; however, in a case where the array substrate 12 is made higher in definition or the driver 13 is driven at a high speed, a signal being transmitted through the wire 23 tends to be easily affected by external noise, with the result that there is a risk that blunting may occur in the signal in the process of transmission. In that respect, since the shield section 25, which is kept at a constant potential, is disposed to overlap the wire 23 via the first insulating film 27, the shielding of the wire 23 by the shield section 25 makes it hard for external noise to affect the signal being transmitted through the wire 23. This makes it hard for blunting to occur in the signal being transmitted through the wire 23 from the flexible substrate side terminal area 19 to the driver side input terminal area 20. In particular, the driver 13 is mounted on the glass substrate 12GS and configured to receive signals through driver side input terminal areas 20 disposed in mounting areas 12G and 12S therefor, and the shielding by the shield section 25 of the wires 23 connected to the driver side input terminal areas 20 means that paths of transmission of signals that are inputted to the driver 13 are evenly shielded. This makes it harder for blunting to occur in the signals. The term "signals" here refers to signals whose potentials may fluctuate over time, and encompasses control system signals and electrical power system signals.

Further, the array substrate 12 further includes a ground wire (constant-potential wire) 24, disposed to extend from the mounting area 12F on the glass substrate 12GS for the flexible substrate 14 to the mounting area 12G or 12S for the driver 13, that is kept at a constant potential. The driver side input terminal area 20 includes a grounding driver side input terminal area (constant-potential driver side terminal area) 20GND connected to the ground wire 24, and the shield section 25 is connected to the grounding driver side input terminal area 20GND. In this way, the driver 13 is supplied with a constant potential by the grounding driver side input terminal area 20GND included in the driver side input terminal area 20. The grounding driver side input terminal area 20GND, by which the driver 13 is supplied with a constant potential, can be utilized to keep the shield section 25 at a constant potential. This achieves a simpler structure than in a case where a structure through to connect the shield section 25 to the ground wire 24 is provided separately from the grounding driver side input terminal area 20GND.

Further, the ground wire 24 is placed at the same layer as the wire 23, and the shield section 25 is disposed to overlap both the wire 23 and the ground wire 24 via the first insulating film (insulating film) 27. In this way, the number of layers can be made smaller than in a case where a ground wire is placed at a different layer from the wire 23 via an insulating film. In addition to that, the shield section 25, by which the wire 23 is shielded, is also disposed to overlap the ground wire 24 via the first insulating film 27. This makes it possible to secure a wide range of formation of the shield section 25, thus achieving a smaller resistant distribution in the shield section 25.

Further, whereas the wire 23 includes an electrical power system wire 23P through which an electrical power system signal is transmitted as the signal and a control system wire 23C through which a control system signal is transmitted as the signal, the ground wire 24 is placed adjacent to the electrical power system wire 23P at a spacing from the electrical power system wire 23P, and the shield section 25 is disposed to overlap at least both the electrical power system wire 23P and the ground wire 24 via the first insulating film (insulating film) 27. The electrical power system wire 23P and the ground wire 24 are both in general larger in line width than the control system wire 23C. Accordingly, the placement of the electrical power system wire 23P and the ground wire 24, which are similar in line width to each other, adjacent to each other at a spacing therebetween makes it easy to design paths of routing of the electrical power system wire 23P and the ground wire 24. In addition to that, the shield section 25, by which at least the electrical power system wire 23P is shielded, is also disposed to overlap the ground wire 24 via the first insulating film 27. This makes it possible to secure a wider range of formation of the shield section 25, thus achieving an even smaller resistant distribution in the shield section 25.

Further, the wire 23 includes an electrical power system wire 23P through which an electrical power system signal is transmitted as the signal and a control system wire 23P through which a control system signal is transmitted as the signal, and the shield section 25 is disposed to overlap both the electrical power system wire 23P and the control system wire 23C via the first insulating film (insulating film) 27. In this way, as the electrical power system wire 23P and the control system wire 23C, which are included in the wire 23, are shielded en bloc by the shield section 25, blunting hardly occurs in signals being transmitted through the electrical power system wire 23P or the control system wire 23C. A resistance distribution in the shield section 25 is made smaller than in a case where the shield section 25 is divided into a shield section that overlaps the electrical power system wire 23P and a shield section that overlaps the control system wire 23C.

Further, the glass substrate 12GS is mounted with a gate driver 13G that, as the driver 13, outputs at least a scanning signal by processing the signal and a source driver 13S that, as the driver 13, outputs at least an image signal by processing the signal, the driver side input terminal area 20 includes a gate driver side input terminal area (gate driver side terminal area) 20G disposed in the mounting area 12G for the gate driver 13G and a source driver side input terminal area (source driver side terminal area) 20S disposed in the mounting area 12S for the source driver 13S, the wire 23 includes a gate driver side wire 23G disposed to extend from the mounting area 12F for the flexible substrate 14 to the mounting area 12G for the gate driver 13G and connected to the flexible substrate side terminal area 19 and the gate driver side input terminal area 20G and a source driver side wire 23S disposed to extend from the mounting area 12F for the flexible substrate 14 to the mounting area 12S for the source driver 13S and connected to the flexible substrate side terminal area 19 and the source driver side input terminal area 20S, and the shield section 25 includes a gate driver side shield section 25G disposed to overlap the gate driver side wire 23G via the first insulating film (insulating film) 27 and a source driver shield section 25S disposed to overlap the source driver side wire 23S via the first insulating film (insulating film) 27. In this way, signals inputted to the flexible substrate side terminal area 19 are transmitted to the gate driver side input terminal area 20G and the source driver side input terminal area 20S through the gate driver side wire 23G and the source driver side wire 20S, and at least parts of the signals are inputted to the gate driver 13G and the source driver 13S, respectively. In the gate driver 13G and the source driver 13S, at least the parts of the signals thus inputted are processed. The shielding of the gate driver side wire 23G by the gate driver side shield section 25G and the shielding of the source driver side wire 23S by the source driver side shield section 25S make it hard for blunting to occur in signals being transmitted through the gate driver side wire 23G or the source driver side wire 23S. Note here that as compared with the gate driver 13G, the source driver 13S tends to process a larger number of signals along with an increase in definition of the array substrate 12 and, accordingly, tends to be driven at an increasingly higher speed. This is more suitable to achieving higher definition, as the source driver side shield section 25S makes it hard for blunting to occur in a signal that is inputted to the source driver 13S.

Further, a liquid crystal panel (display device) 10 according to the present embodiment includes the array substrate 12 described above and a CF substrate (counter substrate) 11 placed opposite the array substrate 12. Such a liquid crystal panel 10, which makes it hard for blunting to occur in a signal being transmitted through the wire 23, makes it hard for display quality to be negatively affected.

Embodiment 2

Embodiment 2 is described with reference to FIG. 8 or 9. Embodiment 2 illustrates changes made to achieve the configuration of a wire 123 and a shield section 125. It should be noted that a repeated description of structures, actions, and effects which are similar to those of Embodiment 1 described above is omitted.

Figure 8:
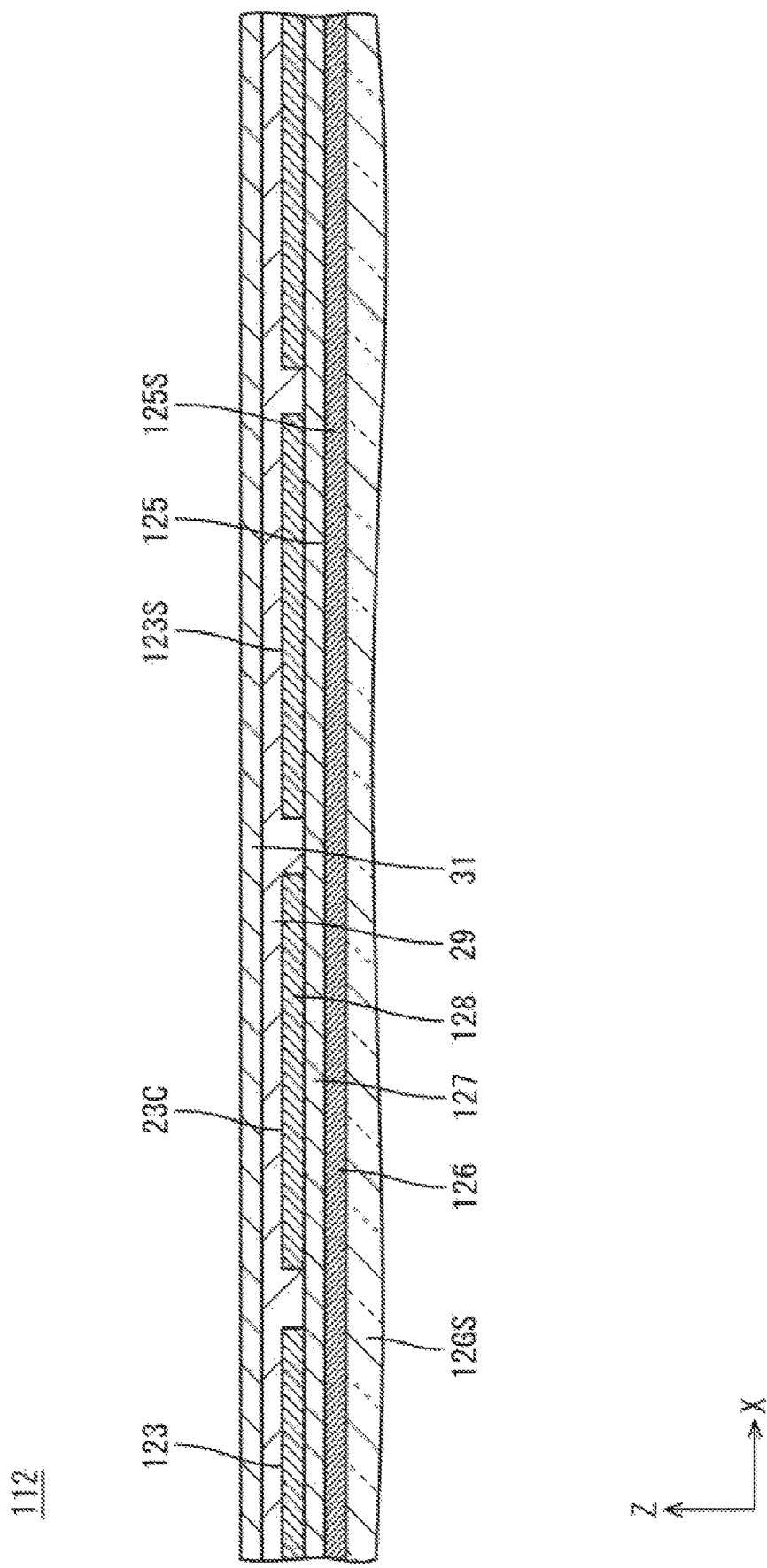
FIG. 8 is a cross-sectional view of a source driver side wire and a source driver side shield section in an array substrate according to Embodiment 2.
Figure 9:
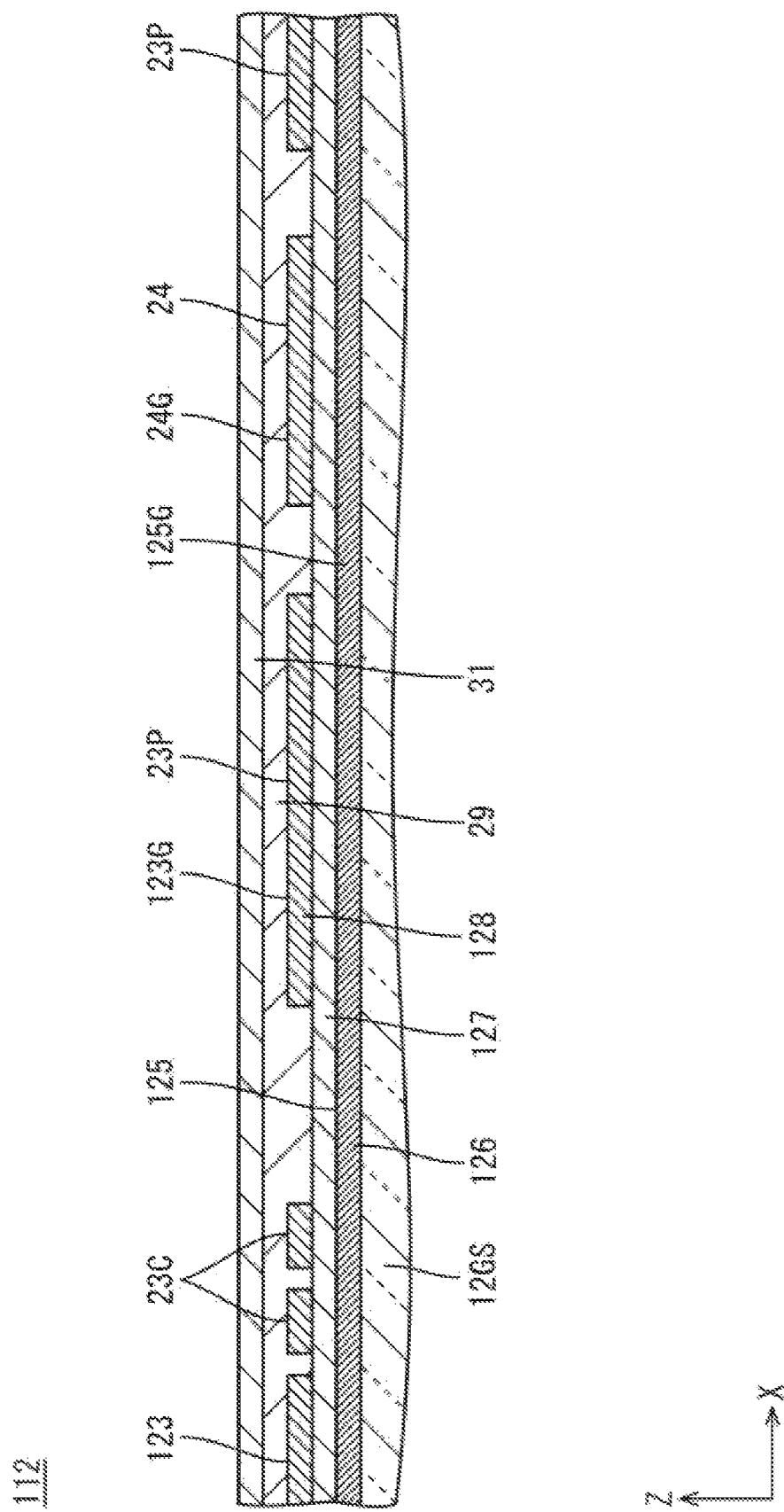
FIG. 9 is a cross-sectional view of a gate driver side wire and a gate driver side shield section in the array substrate.

FIG. 8 is a cross-sectional view of a source driver side wire 123S and a source driver side shield section 125S in an array substrate 112. FIG. 9 is a cross-sectional view of a gate driver side wire 123G and a gate driver side shield section 125G in the array substrate 112. According to the present embodiment, as shown in FIGS. 8 and 9, whereas the wire 123 is composed of a second metal film 128, the shield section 125 is composed of a first metal film 126. Accordingly, the shield section 125 is disposed as a lower layer to overlap the wire 123 via a first insulating film 127. Such a configuration can also bring about actions and effects which are similar to those of Embodiment 1 described above.

Embodiment 3

Embodiment 3 is described with reference to FIG. 10 or 11. Embodiment 3 illustrates changes made to Embodiment 1 described above to achieve the configuration of a wire 223 and a shield section 225. It should be noted that a repeated description of structures, actions, and effects which are similar to those of Embodiment 1 described above is omitted.

Figure 10:
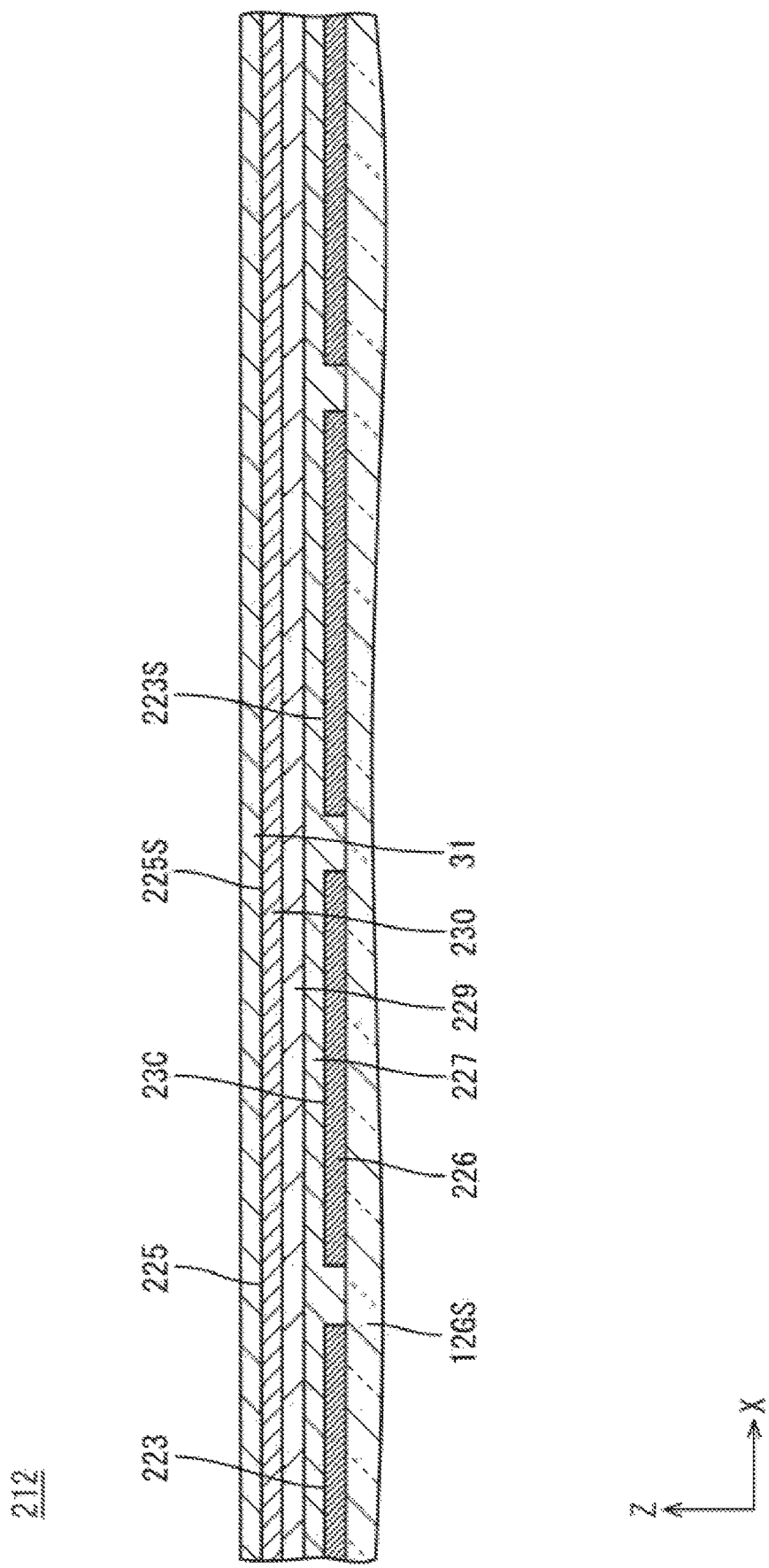
FIG. 10 is a cross-sectional view of a source driver side wire and a source driver side shield section in an array substrate according to Embodiment 3.
Figure 11:
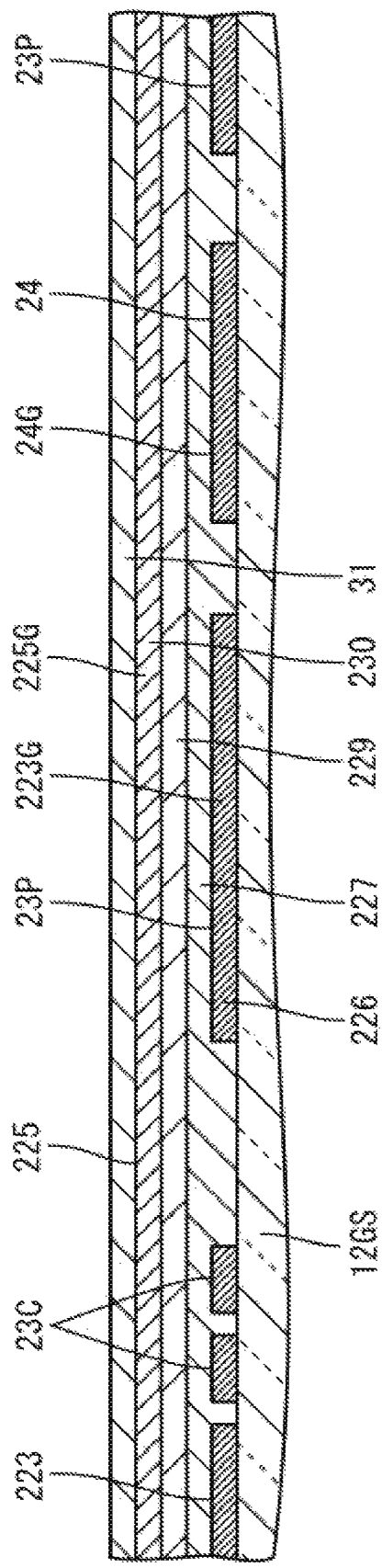
FIG. 11 is a cross-sectional view of a gate driver side wire and a gate driver side shield section in the array substrate.

FIG. 10 is a cross-sectional view of a source driver side wire 223S and a source driver side shield section 225S in an array substrate 212. FIG. 11 is a cross-sectional view of a gate driver side wire 223G and a gate driver side shield section 225G in the array substrate 212. According to the present embodiment, as shown in FIGS. 10 and 11, whereas the wire 223 is composed of a first metal film 226, the shield section 225 is composed of a transparent electrode film 230. Accordingly, the shield section 225 is disposed as a higher layer to overlap the wire 223 via a first insulating film 227 and a second insulating film 229. Such a configuration can also bring about actions and effects which are similar to those of Embodiment 1 described above.

Embodiment 4

Embodiment 4 is described with reference to FIG. 12 or 13. Embodiment 4 illustrates changes made to Embodiment 1 described above to achieve the configuration of a wire 323 and a shield section 325. It should be noted that a repeated description of structures, actions, and effects which are similar to those of Embodiment 1 described above is omitted.

Figure 12:
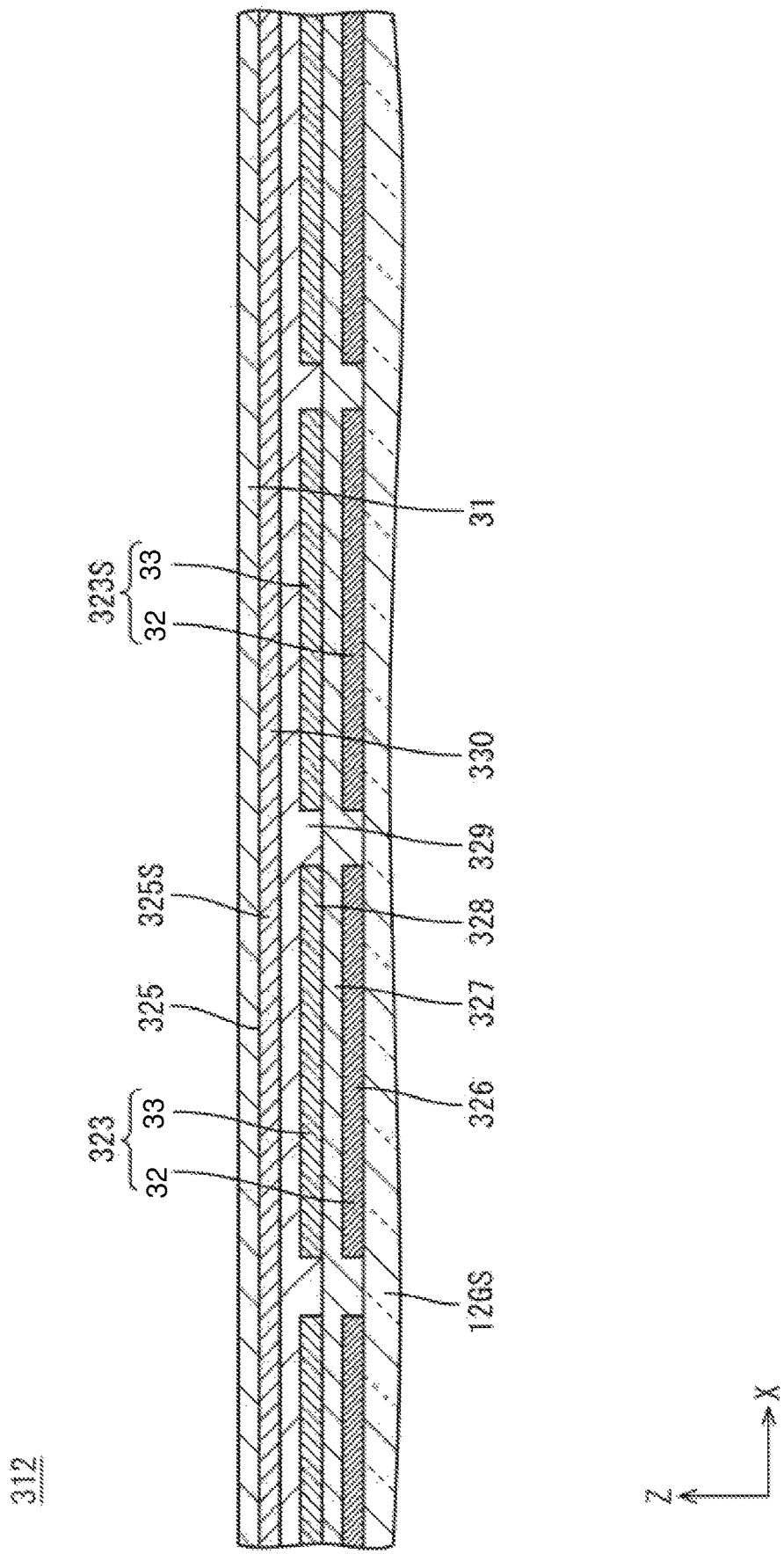
FIG. 12 is a cross-sectional view of a source driver side wire and a source driver side shield section in an array substrate according to Embodiment 4.
Figure 13:
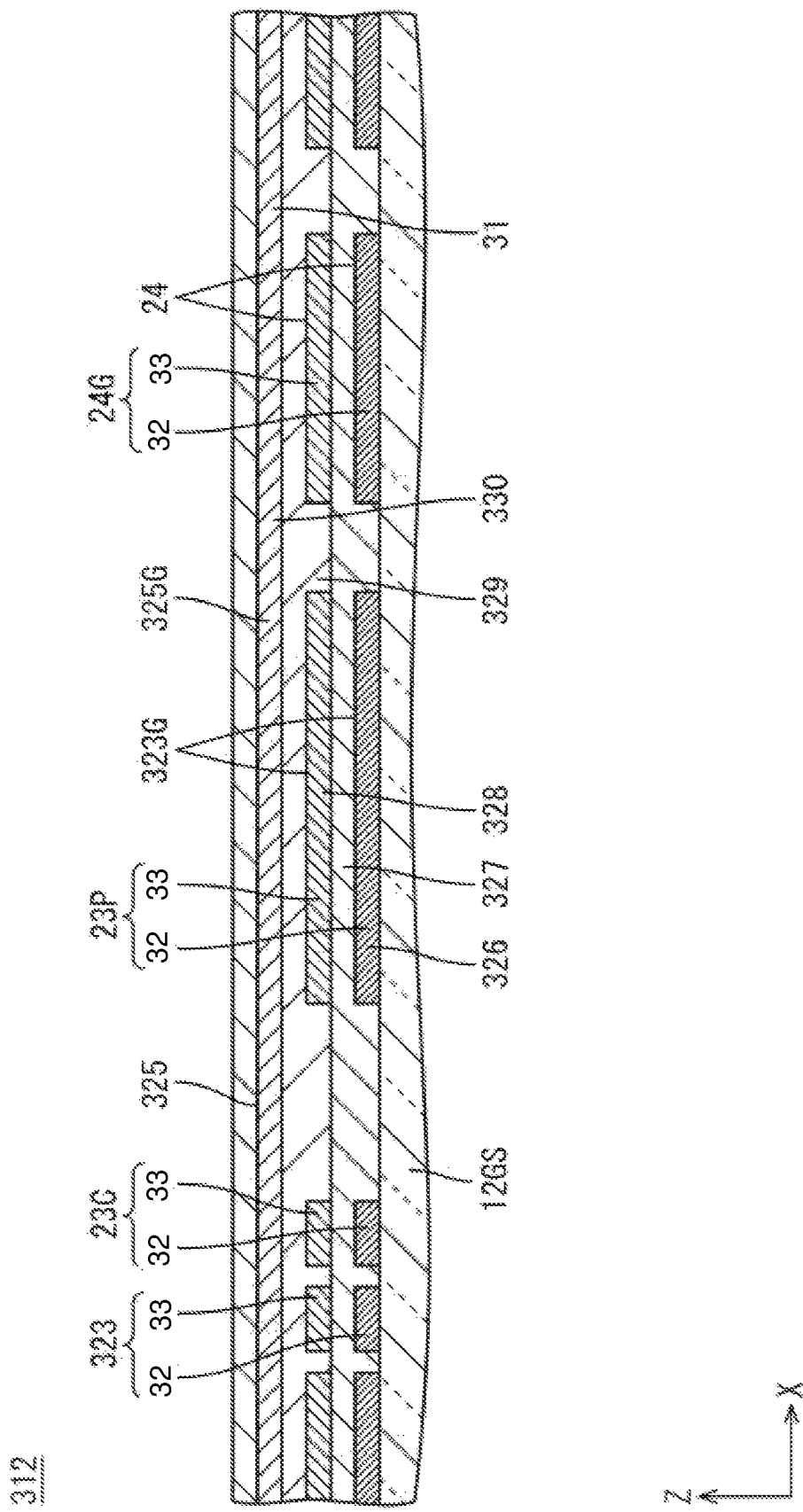
FIG. 13 is a cross-sectional view of a gate driver side wire and a gate driver side shield section in the array substrate.

FIG. 12 is a cross-sectional view of a source driver side wire 323S and a source driver side shield section 325S in an array substrate 312. FIG. 13 is a cross-sectional view of a gate driver side wire 323G and a gate driver side shield section 325G in the array substrate 312. According to the present embodiment, as shown in FIGS. 12 and 13, the wire 323 includes a first wire 32 composed of a first metal film 326 and a second wire 33 composed of a second metal film 328. The second wire 33 is disposed to overlap the first wire 32 via a first insulating film 327. These first and second wires 32 and 33, which allow transmission of different signals, respectively, are suitable to achieving a high-density arrangement of wires 323. Moreover, the shield section 325 is composed of a transparent electrode film 330, and is disposed to overlap both the first wire 32 and the second wire 33 via at least the first insulating film 327. In particular, the shield section 325, which is composed of the transparent electrode film 330, is disposed as a higher layer to overlap the first wire 32, which is composed of the first metal film 326, via the first insulating film 327 and a second insulating film 329. On the other hand, the shield section 325 is disposed as a higher layer to overlap the second wire 33, which is composed of the second metal film 328, via the second insulating film 329. According to such a configuration, the shielding of both the first wire 32 and the second wire 33 by the shield section 325 makes it hard for blunting to occur in signals being transmitted through the first wire 32 or the second wire 33.

According to the present embodiment, as described above, the wire 323 includes a first wire 32 and a second wire 33 disposed to overlap the first wire 32 via a first insulating film (insulating film) 327, and the shield section 325 is disposed to overlap both the first wire 32 and the second wire 33 via a second insulating film (insulating film) 329. This is suitable to achieving a high-density arrangement of wires 323, as this allows transmission of different signals through the first wire 32 and the second wire 33, respectively. The shielding of both the first wire 32 and the second wire 33 by the shield section 325 makes it hard for blunting to occur in signals being transmitted through the first wire 32 or the second wire 33.

Embodiment 5

Embodiment 5 is described with reference to FIG. 14 or 15. Embodiment 5 illustrates changes made to Embodiment 1 described above, for example, to install a different number of gate drivers 413G. It should be noted that a repeated description of structures, actions, and effects which are similar to those of Embodiment 1 described above is omitted.

Figure 14:
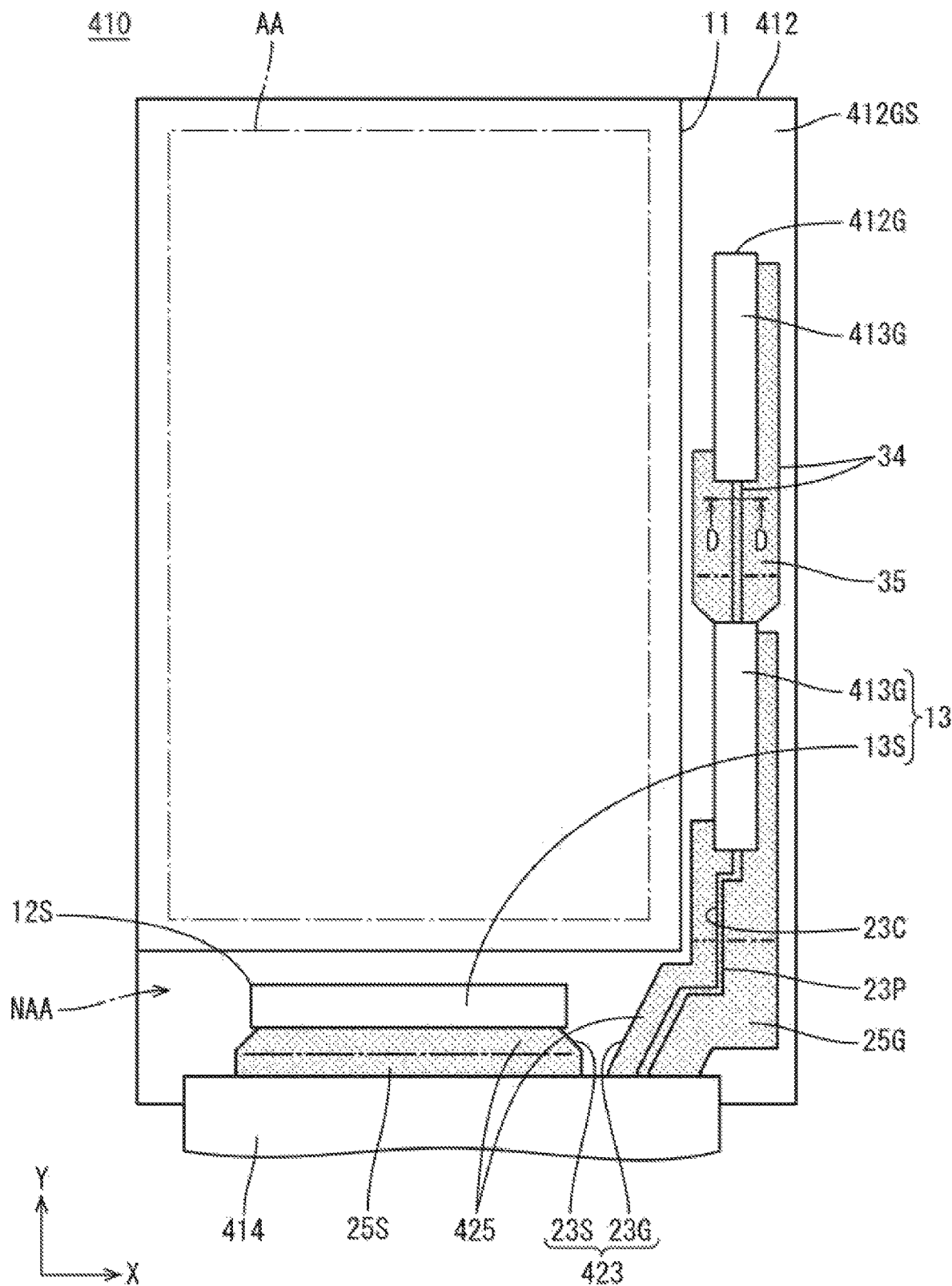
FIG. 14 is a plan view of a liquid crystal panel according to Embodiment 5.

FIG. 14 is a plan view of a liquid crystal panel 410. According to the present embodiment, as shown in FIG. 14, the liquid crystal panel 410 has a vertically long square shape when seen in plan view, and has its long-side direction and short-side direction corresponding to the Y-axis direction and the X-axis direction, respectively. The liquid crystal panel 410 is constituted by an array substrate 412 whose glass substrate 412GS is mounted with two gate drivers (drivers) 413G located at a spacing from each other in the Y-axis direction. The glass substrate 412GS of the array substrate 412 is provided with an inter-driver wire 34 disposed to pass transversely across a space between mounting areas 412G for the gate drivers 413G that are adjacent to each other in the Y-axis direction. The inter-driver wire 34 is connected to a driver side input terminal area disposed in each of the mounting areas 412G for the gate drivers 413G that are adjacent to each other in the Y-axis direction. Accordingly, at least a part of a signal transmitted through a wire 423 to the driver side input terminal area disposed in the mounting area 412G for one of the two gate drivers 413G that is located closer to a flexible substrate 414 (i.e. located on the lower side of FIG. 14) is transmitted through the inter-driver wire 34 to the driver side input terminal area disposed in the mounting area 412G for one of the two gate drivers 413G that is located farther away from the flexible substrate 414 (i.e. located on the upper side of FIG. 14).

Figure 15:
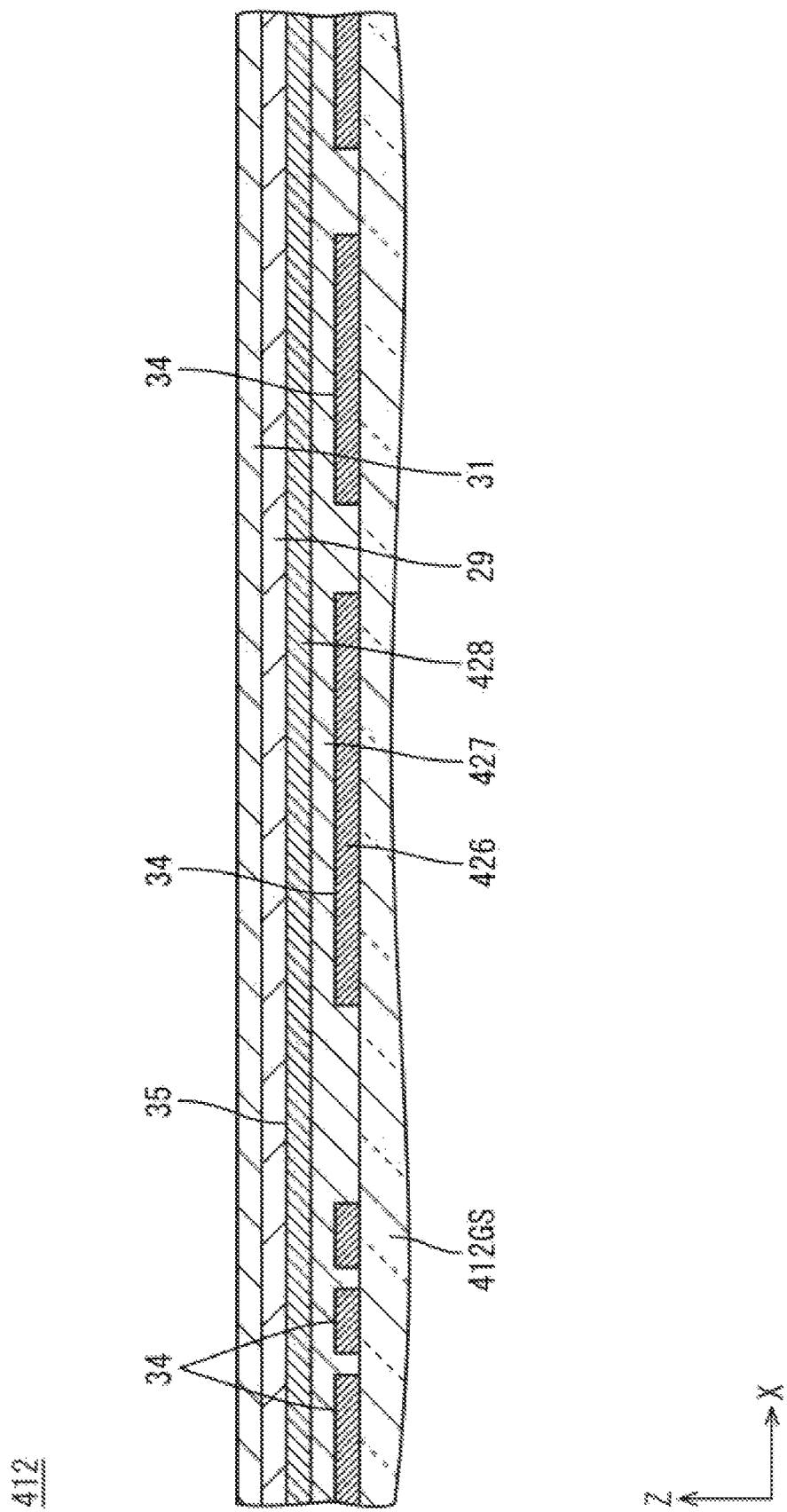
FIG. 15 is a cross-sectional view of an array substrate as taken along line D-D in FIG. 14.

FIG. 15 is a cross-sectional view of the array substrate 412 in and near the inter-driver wire 34 and the after-mentioned inter-driver shield section 35. Moreover, as shown in FIG. 15, the glass substrate 412GS of the array substrate 412 is provided with an inter-driver shield section 35 disposed to overlap the inter-driver wire 34. Whereas the inter-driver wire 34 is composed of the same first metal film 426 as the wire 423 and the like, the inter-driver shield section 35 is composed of the same second metal film 428 as the shield section 425 and the like. Accordingly, the inter-driver shield section 35 is disposed to overlap the inter-driver wire 34 via a first insulating film 427. The inter-driver shield section 35 is kept at the same ground potential (constant potential) as the shield section 425. According to such a configuration, the inter-driver wire 34 is shielded by the inter-driver shield section 35. This makes it hard for blunting to occur in a signal being transmitted through the inter-driver wire 34.

As described above, according to the present embodiment, the glass substrate 412GS is mounted with a plurality of gate drivers (drivers) 413G located at a spacing from each other, and includes an inter-driver wire 34 disposed to pass transversely across a space between mounting areas 412G on the glass substrate 412GS for the gate drivers 413G that are adjacent to each other and connected to a driver side input terminal area disposed in each of the mounting areas 412G for the gate drivers 413G that are adjacent to each other and an inter-driver shield section 35, disposed over the glass substrate 412GS to overlap the inter-driver wire 34 via a first insulating film (insulating film) 427, that is kept at a constant potential. In this way, at least a part of a signal transmitted through a wire 423 to the driver side input terminal area disposed in the mounting area 412G for one of the adjacent gate drivers 413G is transmitted through the inter-driver wire 34 to the driver side input terminal area disposed in the mounting area 412G for the other gate driver 413G. Since the inter-driver shield section 35, which is kept at a constant potential, is disposed to overlap the inter-driver wire 34 via the first insulating film 427, the inter-driver wire 34 is shielded by the inter-driver shield section 35. This makes it hard for blunting to occur in a signal being transmitted through the inter-driver wire 34.

Embodiment 6

Embodiment 6 is described with reference to FIG. 16 or 17. Embodiment 6 illustrates changes made to Embodiment 5 described above, for example, to install a different number of source drivers 513S. It should be noted that a repeated description of structures, actions, and effects which are similar to those of Embodiment 5 described above is omitted.

Figure 16:
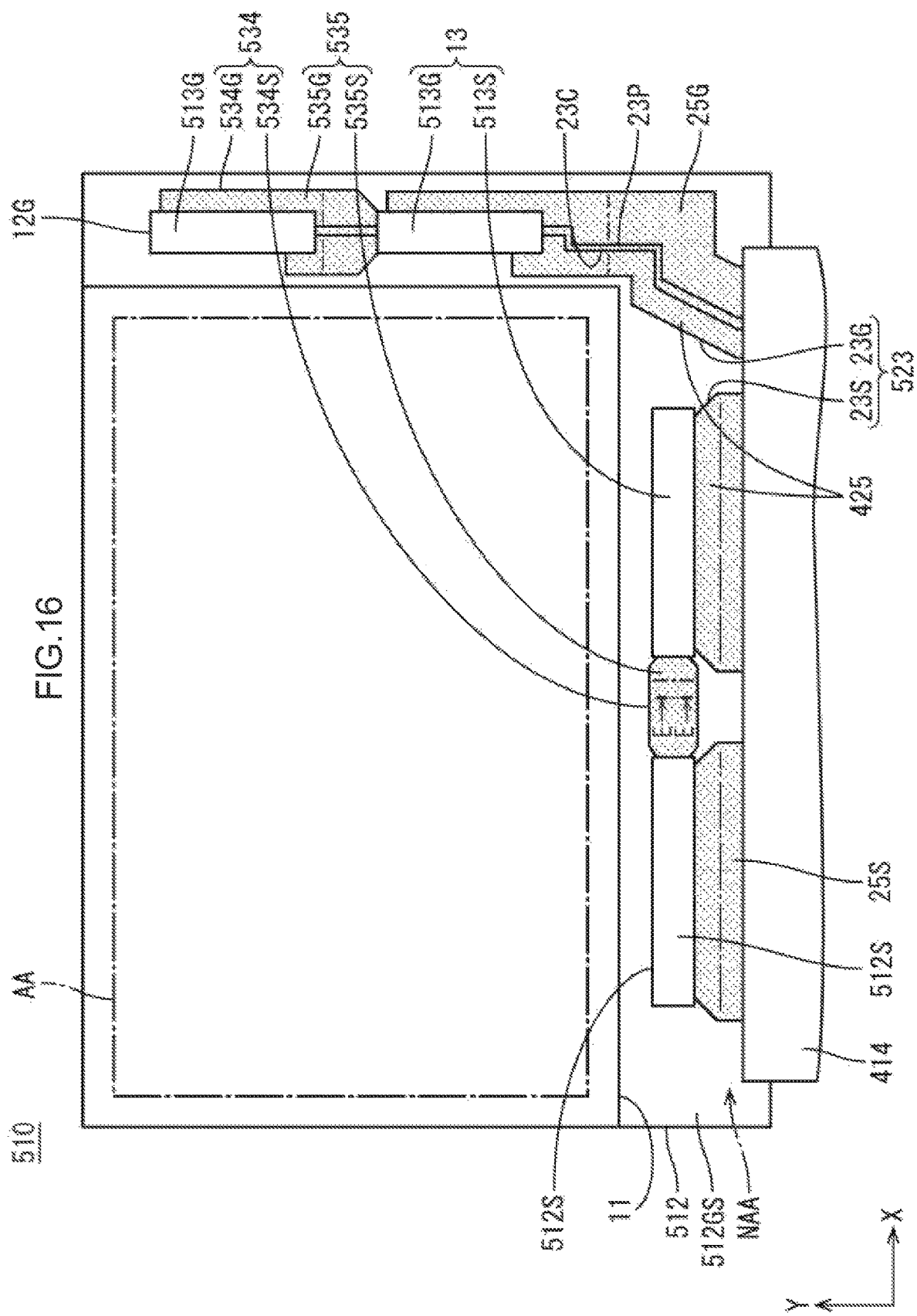
FIG. 16 is a plan view of a liquid crystal panel according to Embodiment 6.

FIG. 16 is a plan view of a liquid crystal panel 510. According to the present embodiment, as shown in FIG. 16, the liquid crystal panel 510 has a horizontally long square shape when seen in plan view, and has its long-side direction and short-side direction corresponding to the X-axis direction and the Y-axis direction, respectively. The liquid crystal panel 510 is constituted by an array substrate 512 whose glass substrate 512GS is mounted with two source drivers (drivers) 513S located at a spacing from each other in the X-axis direction. The glass substrate 512GS of the array substrate 512 is provided with an inter-driver wire 534 constituted by an inter-source-driver wire 534S disposed to pass transversely across a space between mounting areas 512S for the source drivers 513S that are adjacent to each other in the X-axis direction. It should be noted that the present embodiment distinguishes between inter-driver wires 534 by referring to, as "inter-gate-driver wire 534G", an inter-driver wire 534 located between adjacent gate drivers 513G and referring to, as "inter-source-driver wire 534S", an inter-driver wire 534 located between adjacent source drivers 513S. The inter-source-driver wire 534S is connected to a driver side input terminal area disposed in each of the mounting areas 512S for the source drivers 513S that are adjacent to each other in the X-axis direction. Accordingly, at least a part of a signal transmitted through a wire 523 to the driver side input terminal area disposed in the mounting area 512S for one of the two source drivers 513S is transmitted through the inter-source-driver wire 534S to the driver side input terminal area disposed in the mounting area 512S for the other source driver 513S.

Figure 17:
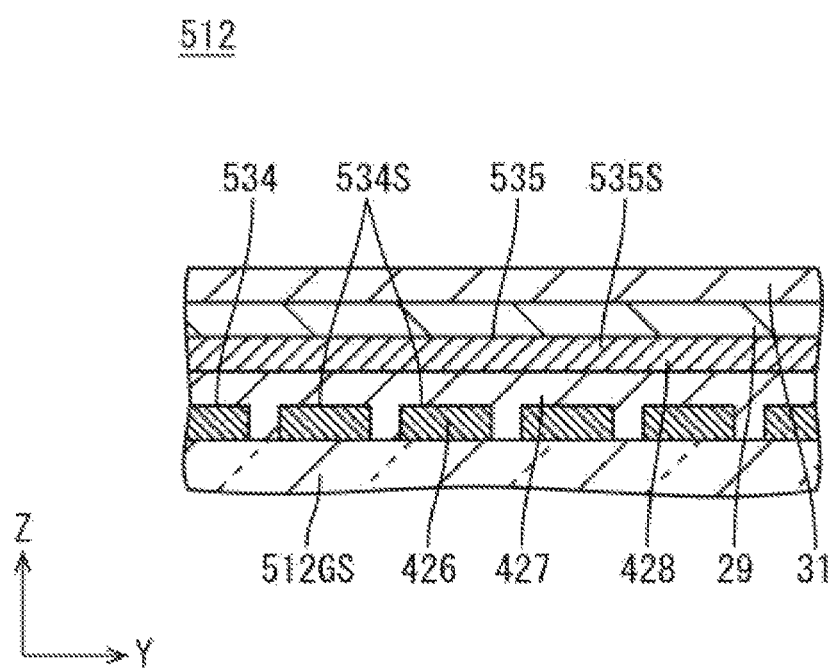
FIG. 17 is a cross-sectional view of an array substrate as taken along line E-E in FIG. 16.

FIG. 17 is a cross-sectional view of the array substrate 512 in and near the inter-source-driver wire 534S and the after-mentioned inter-source-driver shield section 535S. Moreover, as shown in FIG. 17, the glass substrate 512GS of the array substrate 512 is provided with an inter-source-driver shield section 535S disposed to overlap the inter-source-driver wire 534S. It should be noted that the present embodiment distinguishes between inter-driver shield sections 535 by referring to, as "inter-gate-driver shield section 535G", an inter-driver shield section 535 that overlaps the inter-gate-driver wire 534G and referring to, as "inter-source-driver shield section 535S", an inter-driver shield section 535 that overlaps the inter-source-driver wire 534S. Whereas the inter-source-driver shield section 535S is composed of the same first metal film 526 as the wire 523 and the like, the inter-source-driver shield section 535S is composed of the same second metal film 528 as the shield section 525 and the like. Accordingly, the inter-source-driver shield section 535S is disposed to overlap the inter-source-driver wire 534S via a first insulating film 527. The inter-source-driver shield section 535S is kept at the same ground potential (constant potential) as the shield section 525. According to such a configuration, the inter-source-driver wire 534S is shielded by the inter-source-driver shield section 535S. This makes it hard for blunting to occur in a signal being transmitted through the inter-source-driver wire 534S.

Embodiment 7

Embodiment 7 is described with reference to FIG. 18 or 19. Embodiment 7 illustrates changes made to Embodiment 1 described above to achieve the configuration of a shield section 625. It should be noted that a repeated description of structures, actions, and effects which are similar to those of Embodiment 1 described above is omitted.

Figure 18:
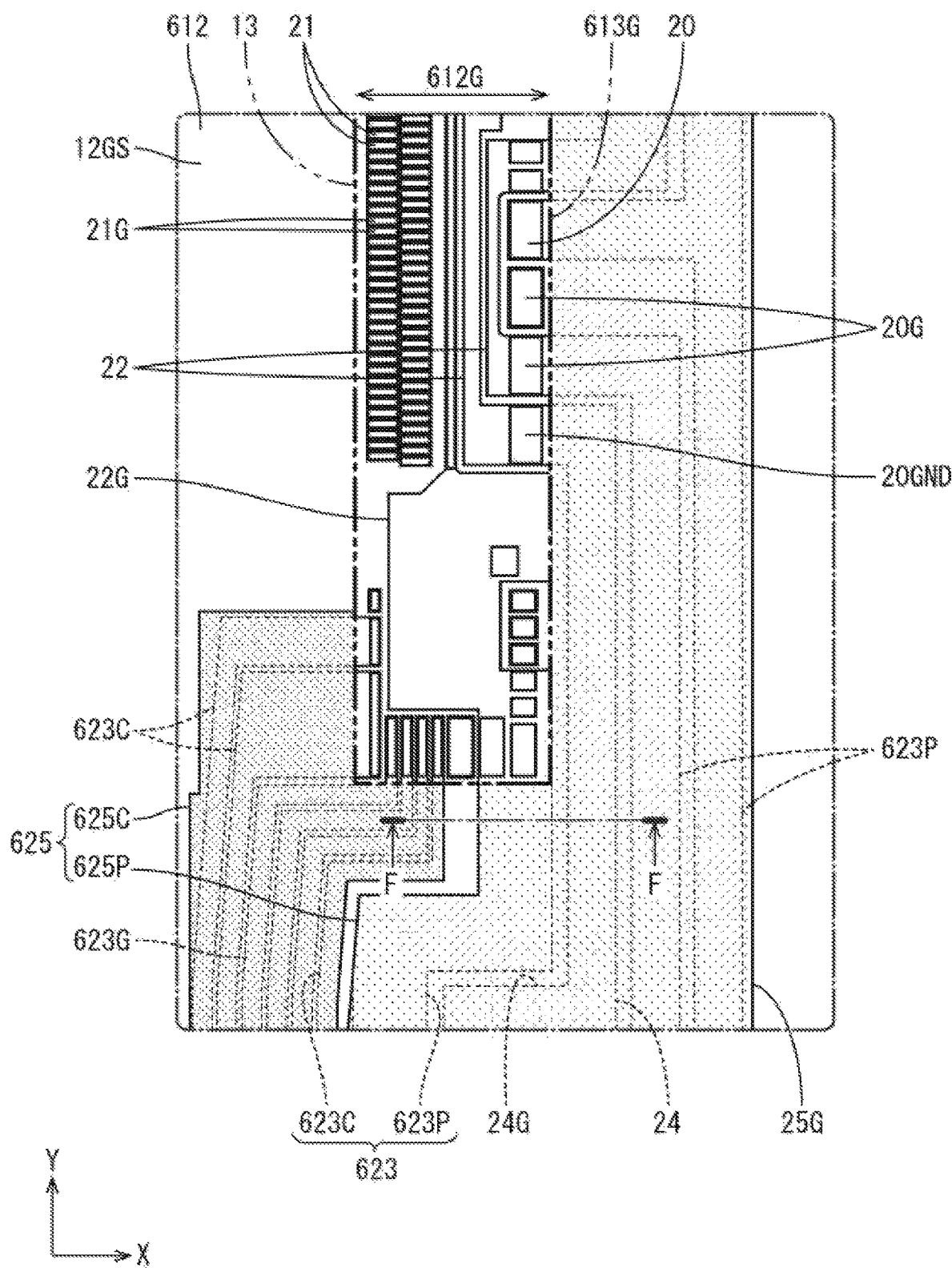
FIG. 18 is a plan view of an array substrate according to Embodiment 7 in and near a mounting area for a gate driver.

FIG. 18 is a plan view of an array substrate 612 in and near a mounting area 612G for a gate driver 613G. As shown in FIG. 18, a shield section 625 (gate driver side shield section 625G) according to the present embodiment is divided into an electrical power system shield section 625P that selectively overlaps an electrical power system wire 623P included in a wire 623 (gate driver side wire 623G) and a control system shield section 625C that selectively overlaps a control system wire 623C included in the wire 623. The electrical power system shield section 625P and the control system shield section 625C are mechanically and electrically separated from each other. According to such a configuration, the separate shielding of the electrical power system wire 623P and the control system wire 623C, which are included in the wire 623, by the electrical power system shield section 625P and the control system shield section 625C makes it hard for blunting to occur in signals being transmitted through the electrical power system wire 623P or the control system wire 623C. Since the shield section 625 is separated into the electrical power system shield section 625P and the control system shield section 625C, a degree of freedom in arrangement of the electrical power system wire 623P and the control system wire 623C in the Z-axis direction (i.e. a direction of overlap of the electrical power system shield section 625P and the control system shield section 625C) can be made higher than in Embodiment 1 described above. It should be noted that FIG. 18 distinguishes between the electrical power system shield section 625P and the control system shield section 625C by using different types of half-tone dot meshing to illustrate them.

Figure 19:
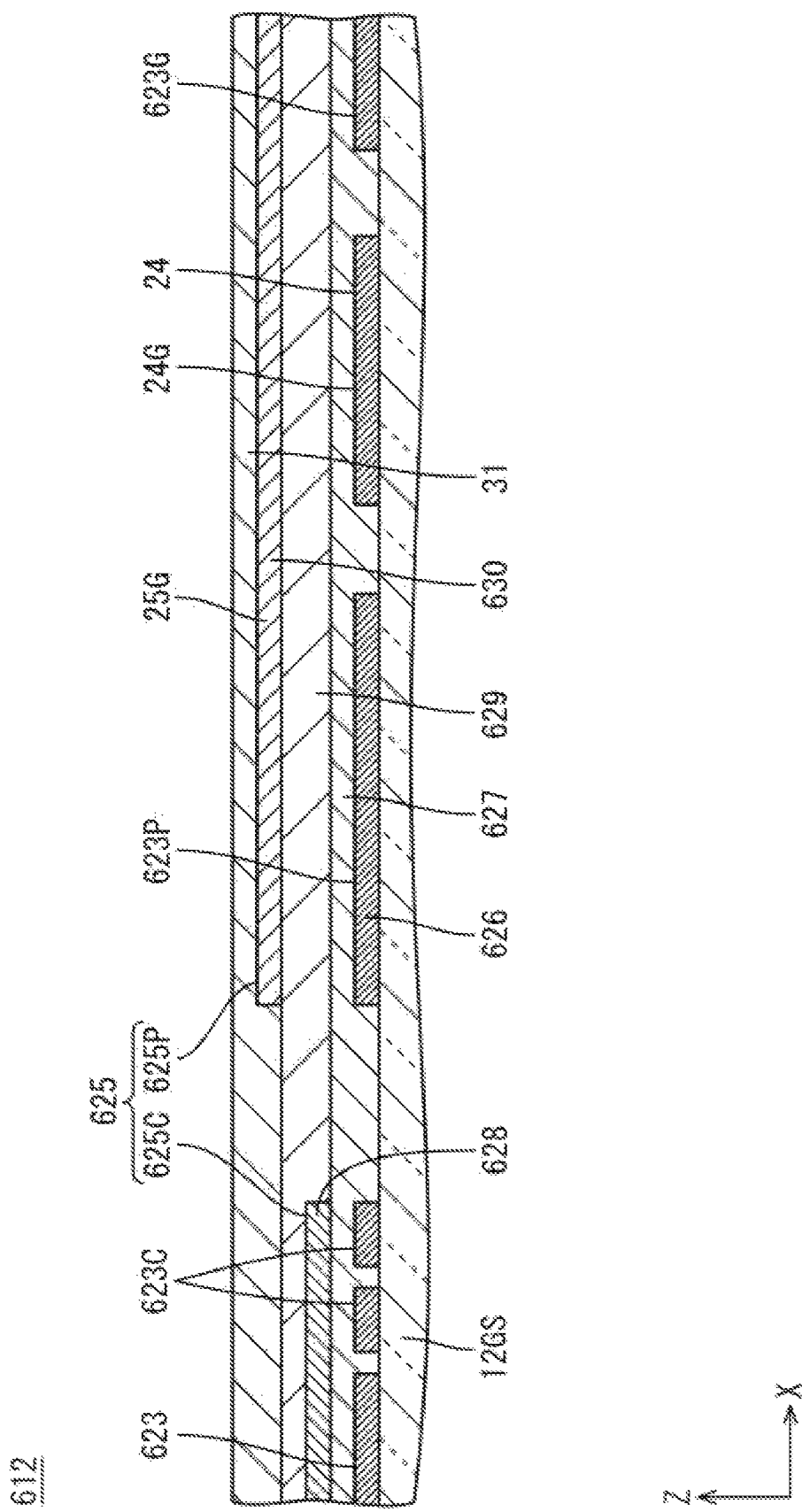
FIG. 19 is a cross-sectional view of an array substrate as taken along line F-F in FIG. 18.

FIG. 19 is a cross-sectional view of the array substrate 612 in and near the wire 623 and the shield section 625. As shown in FIG. 19, whereas the electrical power system shield section 625P is composed of a transparent electrode film 630, the control system shield section 625C is composed of a second metal film 628. Accordingly, the electrical power system shield section 625P is disposed to overlap the electrical power system wire 623P, which is composed of a first metal film 626, via a first insulating film 627 and a second insulating film 629. On the other hand, the control system shield section 625C is disposed to overlap the control system wire 623C, which is composed of the first metal film 626, via the first insulating film 627. Accordingly, the control system shield section 625C is located closer to the control system wire 623C in the Z-axis direction than the electrical power system shield section 625P is located in relation to the electrical power system wire 623P in the direction of overlap. According to such a configuration, a signal being transmitted through the control system wire 623C that is easily affected by noise can be more efficiently shielded than a signal being transmitted through the electrical power system wire 623P. This makes it harder for a signal being transmitted through the control system wire 623C to get blunted under the influence of noise.

According to the present embodiment, as described above, the wire 623 includes an electrical power system wire 623P through which an electrical power system signal is transmitted as the signal and a control system wire 623C through which a control system signal is transmitted as the signal, and the shield section 625 includes an electrical power system shield section 625P disposed to overlap the electrical power system wire 623P via a first insulating film (insulating film) 627 and a second insulating film (insulating film) 629 and a control system shield section 625C disposed to overlap the control system wire 623C via the first insulating film (insulating film) 627 and separated from the electrical power system shield section 625P. In this way, the separate shielding of the electrical power system wire 623P and the control system wire 623C, which are included in the wire 623, by the electrical power system shield section 625P and the control system shield section 625C makes it hard for blunting to occur in signals being transmitted through the electrical power system wire 623P or the control system wire 623C. Since the shield section 625 is separated into the electrical power system shield section 625P and the control system shield section 625C, a degree of freedom in arrangement of the electrical power system wire 623P and the control system wire 623C in a direction of overlap of the electrical power system shield section 625P and the control system shield section 625C can be made higher than in a case where a shield section is disposed to shield the electrical power system shield section 625P and the control system shield section 625C en bloc.

Further, the electrical power system wire 623P and the control system wire 623C are placed at the same layer as each other, and the control system shield section 625C is located closer to the control system wire 623C in a direction of overlap than the electrical power system shield section 625P is located in relation to the electrical power system wire 623P in the direction of overlap. A signal being transmitted through the control system wire 623C tends to be more easily affected by noise than a signal being transmitted through the electrical power system wire 623P. In that respect, since the control system shield section 625C is located closer to the control system wire 623C in the direction of overlap than the electrical power system shield section 625P is located in relation to the electrical power system wire 623P in the direction of overlap, a signal being transmitted through the control system wire 623C can be more efficiently shielded. This makes it harder for a signal being transmitted through the control system wire 623C to get blunted under the influence of noise.

Embodiment 8

Embodiment 8 is described with reference to FIG. 20. Embodiment 8 illustrates changes made to Embodiment 7 described above to achieve the configuration of a shield section 725. It should be noted that a repeated description of structures, actions, and effects which are similar to those of Embodiment 7 described above is omitted.

Figure 20:
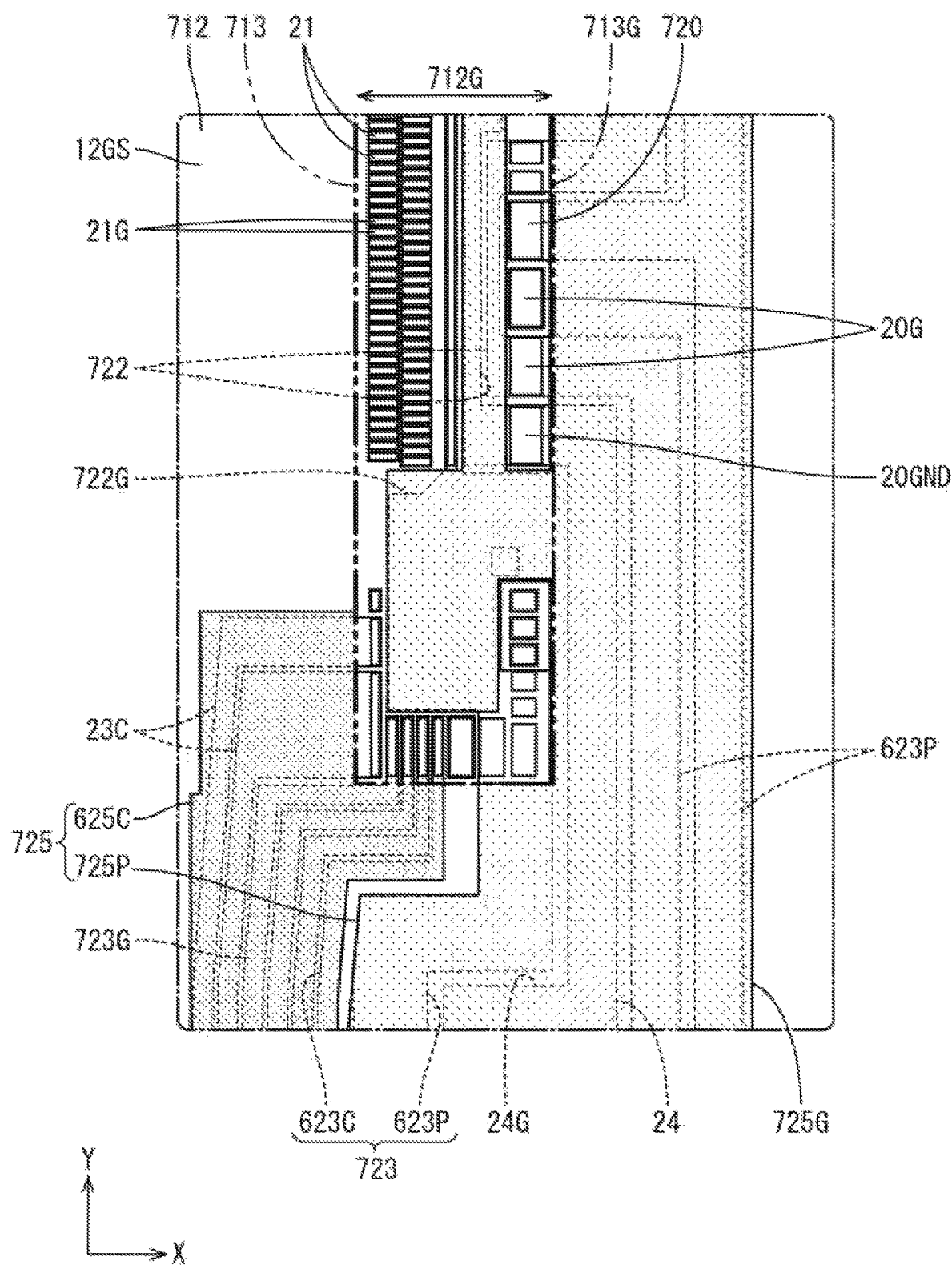
FIG. 20 is a plan view of an array substrate according to Embodiment 8 in and near a mounting area for a gate driver.

FIG. 20 is a plan view of an array substrate 712 in and near a mounting area 712G for a gate driver 713G. As shown in FIG. 20, a shield section 725 (gate driver side shield section 725G) according to the present embodiment includes an electrical power system shield section 725P disposed to overlap both a wire 723 (gate driver side wire 723G) and a driver overlap wire 722 (gate driver overlap wire 722G). Whereas the electrical power system shield section 725P is composed of a transparent electrode film as in the case of Embodiment 7 described above (see FIG. 19), the wire 723 and the driver overlap wire 722 are composed of a first metal film as in the cases of Embodiments 1 and 7 described above (see FIGS. 6 and 19). Accordingly, a first insulating film and a second insulating film are sandwiched between the electrical power system shield section 725P and both the wire 723 and the driver overlap wire 722, which overlap each other. According to such a configuration, the wire 723 and the driver overlap wire 722 are shielded en bloc by the shield section 725. The shielding of the driver overlap wire 722, which is disposed to overlap a driver 713, by the shield section 725 makes it harder for signal blunting to occur.

According to the present embodiment, as described above, the glass substrate 712GS includes a driver overlap wire 722 placed at the same layer as the wire 723, disposed to overlap the driver 713, and connected to the driver side input terminal area 720, and the shield section 725 is disposed to overlap both the wire 723 and the driver overlap wire 722 via a first insulating film (insulating film) and a second insulating film (insulating film). In this way, the wire 723 and the driver overlap wire 722 are shielded en bloc by the shield section 725. The shielding of the driver overlap wire 722, which is disposed to overlap the driver 713, by the shield section 725 makes it harder for signal blunting to occur.

Other Embodiments

The technology disclosed herein is not limited to the embodiments described with reference to the foregoing description and drawings. For example, embodiments such as those listed below are encompassed in the technical scope.

(1) There may be a configuration in which a third metal film is stacked as a higher layer over the second metal film 28, 128, 328, 428, 528, or 628 via an insulating film. In that case, the transparent electrode film 30, 230, 330, or 630 may be stacked as a higher layer over the third metal film via an insulating film. This third metal film may constitute at least a part of the shield section 25, 125, 225, 325,425, 625, or 725. Further, the third metal film may also constitute at least a part of the wire 23, 123, 223, 323,423, 523, 623, or 723. Further, the third metal film may also constitute at least a part of the ground wire 24.

(2) In a case where the third metal film is added as in the case of (1) described above, the second wire 33 described in Embodiment 4 may be constituted by the third metal film. In that case, the first wire 32 is constituted by the first metal film 26, 126, 226, 326, 426, 526, or 626 or the second metal film 28, 128, 328,428, 528, or 628. At this point in time, in a case where the first wire 32 is composed of the first metal film 26, 126, 226, 326, 426, 526, or 626, the shield section 25, 125, 225, 325, 425, 625, or 725 may be constituted by the second metal film 28, 128, 328,428, 528, or 628, or in a case where the first wire 32 is constituted by the second metal film 28, 128, 328,428, 528, or 628, the shield section 25, 125, 225, 325, 425, 625, or 725 may be constituted by the first metal film 26, 126, 226, 326, 426, 526, or 626. Furthermore, in addition to the first metal wire 32 being constituted by the first metal film 26, 126, 226, 326, 426, 526, or 626 and the second wire 33 being constituted by the second metal film 28, 128, 328,428, 528, or 628, a third wire that overlaps the first wire 32 and the second wire 33 may be constituted by the third metal film.

(3) There may be a configuration in which in addition to the third metal film added as in the case of (1) described above, a fourth metal film is stacked as a higher layer over the third metal film via an insulating film. Furthermore, it is also possible to adopt a configuration in which a fifth metal film is stacked as a higher layer over the fourth metal film via an insulating film.

(4) The transparent electrode film 30, 230, 330, or 630 is not limited to a configuration in which only one transparent electrode film 30, 230, 330, or 630 is provided, but two transparent electrode films 30, 230, 330, or 630 may be provided via an insulating film. In that case, the transparent electrode film 30, 230, 330, or 630 located at a lower layer serves as a first transparent electrode film, and the transparent electrode film 30, 230, 330, or 630 stacked as a higher layer over the first transparent electrode film via an insulating film serves as a second transparent electrode film. At least a part of the shield section 25, 125, 225, 325,425, 625, or 725 may be constituted by at least parts of the first and second electrode films.

(5) Each terminal area 19, 20, 21, or 720 is not limited to a three-layer laminated structure but may be a two-layer laminated structure composed of the first metal film 26, 126, 226, 326, 426, 526, or 626 and the transparent electrode film 30, 230, 330, or 630. Further, in a case where at least a part of the wire 23, 123, 223, 323, 423, 523, 623, or 723 is composed of the second metal film 28, 128, 328, 428, 528, or 628 as in the case of Embodiment 2 or 4, each terminal area 19, 20, 21, or 720 may be a two-layer laminated structure composed of the second metal film 28, 128, 328, 428, 528, or 628 and the transparent electrode film 30, 230, 330, or 630. Further, each terminal area 19, 20, 21, or 720 does not need to include the transparent electrode film 30, 230, 330, or 630 but may for example be a single-layer structure composed of either the first metal film 26, 126, 226, 326, 426, 526, or 626 or the second metal film 28, 128, 328, 428, 528, or 628 or be a two-layer laminated structure of the first metal film 26, 126, 226, 326, 426, 526, or 626 and the second metal film 28, 128, 328, 428, 528, or 628.

(6) According to a modification of Embodiment 2 or 3, the wire 23, 123, 223, 323, 423, 523, 623, or 723 may be composed of the second metal film 28, 128, 328, 428, 528, or 628, and the shield section 25, 125, 225, 325,425, 625, or 725 may be composed of the transparent electrode film 30, 230, 330, or 630.

(7) According to a modification of Embodiment 5 or 6, the inter-driver wire 34 or 534 may be composed of the second metal film 28, 128, 328, 428, 528, or 628, and the inter-driver shield section 35 or 535 may be composed of the first metal film 26, 126, 226, 326, 426, 526, or 626. Alternatively, the inter-driver wire 34 or 534 may be composed of the first metal film 26, 126, 226, 326, 426, 526, or 626, and the inter-driver shield section 35 or 535 may be composed of the transparent electrode film 30, 230, 330, or 630. Alternatively, the inter-driver wire 34 or 534 may be composed of the second metal film 28, 128, 328, 428, 528, or 628, and the inter-driver shield section 35 or 535 may be composed of the transparent electrode film 30, 230, 330, or 630. Furthermore, whereas the inter-driver wire 34 or 534 may be constituted by a first wire composed of the first metal film 26, 126, 226, 326, 426, 526, or 626 and a second wire composed of the second metal film 28, 128, 328, 428, 528, or 628 and disposed to overlap the first wire via the first insulating film 27, 127, 227, 327, 427, 527, or 627, the inter-driver shield section 35 or 535 may be composed of the transparent electrode film 30, 230, 330, or 630.

(8) The inter-driver shield section 35 or 535 described in Embodiment 5 or 6 may be at a different constant potential from the shield section 25, 125, 225, 325,425, 625, or 725.

(9) According to a modification of Embodiment 7 or 8, the control system shield section 625C may be disposed to overlap both the wire 23, 123, 223, 323,423, 523, 623, or 723 and the driver overlap wire 22 or 722.

(10) The configurations described above in the embodiments may be combined as appropriate.

(11) The shield section 25, 125, 225, 325,425, 625, or 725 may be kept at a constant potential other than the ground potential. For example, the shield section 25, 125, 225, 325,425, 625, or 725 may be kept at a common potential or a pulled-up reference potential as the constant potential.

(12) The flexible substrate side terminal area 19 may include a grounding flexible substrate side terminal area connected to the ground wire 24. In that case, the shield section 25, 125, 225, 325,425, 625, or 725 may be connected to at least either the grounding driver side input terminal area 20GND or the grounding flexible substrate side terminal area.

(13) The source driver side shield section 25S, 125S, 225S, 325S and the gate driver side shield section 25G, 125G, 225G, 325G, or 725G may be joined to each other.

(14) The shield section 25, 125, 225, 325,425, 625, or 725 may be disposed to selectively overlap only either the gate driver side wire 23G, 123G, 223G, 323G, 623G, or 723G or the source driver side wire 23S, 123S, 223S, or 323S included in the wire 23, 123, 223, 323, 423, 523, 623, or 723.

(15) The shield section 25, 125, 225, 325,425, 625, or 725 may be disposed to selectively overlap only either the electrical power system wire 23P or 623P or the control system wire 23C or 623C included in the wire 23, 123, 223, 323, 423, 523, 623, or 723.

(16) The array substrate 12, 112, 212, 312, 412, 512, 612, or 712 may be mounted only with the source driver 13S or 513S as the driver 13 or 713, and the gate driver 13G, 413G, 513G, 613G, or 713G may be omitted. In that case, the shield section 25, 125, 225, 325,425, 625, or 725 is disposed to overlap the source driver side wire 23S, 123S, 223S, or 323S. Further, in exchange for the omission of the gate driver 13G, 413G, 513G, 613G, or 713G, a gate driver circuit section may be monolithically provided in the array substrate 12, 112, 212, 312, 412, 512, 612, or 712, although this is not always the case.

(17) The specific numbers of wires 23, 123, 223, 323, 423, 523, 623, or 723 and ground wires 24 that are installed and the specific paths of routing of the wires 23, 123, 223, 323, 423, 523, 623, or 723 and the ground wires 24 may be changed as appropriate to numbers and paths other than those illustrated.

(18) The specific numbers of gate drivers 13G, 413G, 513G, 613G, or 713G and source drivers 13S or 513S that are mounted and the specific planar shapes of the gate drivers 13G, 413G, 513G, 613G, or 713G and the source drivers 13S or 513S may be changed as appropriate to numbers and shapes other than those illustrated. Further, the specific number of flexible substrates 14 or 414 that are mounted may be changed as appropriate to a number other than that illustrated.

(19) The specific planar shape of the array substrate 12, 112, 212, 312, 412, 512, 612, or 712 may be changed as appropriate, for example, to a trapezoid, a circle, a semicircle, or the like other than a square.

(20) The switching elements that are provided in the display area AA of the array substrate 12, 112, 212, 312, 412, 512, 612, or 712 may be switching elements (e.g. thin-film diodes (TFDs)) other than the TFTs 17.

(21) Instead of being of a transmissive type, the liquid crystal panel 10, 410, or 510 may be of a reflective type in which a display is performed by utilizing outside light or may be of a semitransmissive type.

(22) The liquid crystal panel 10, 410, or 510 may be replaced by an organic EL panel, an EPD (microcapsule electrophoretic display), or a MEMS (micro-electromechanical systems) display panel.

What is claimed is:

1. A substrate for a display device, the substrate comprising:
a substrate section on which a flexible substrate and a driver are mounted;
a flexible substrate side terminal area, disposed in a mounting area on the substrate section for the flexible substrate, to which a signal is inputted from the flexible substrate;
a driver side terminal area, disposed in a mounting area on the substrate section for the driver, through which at least a part of the signal is inputted and outputted to the driver;
a wire, disposed to extend from the mounting area on the substrate section for the flexible substrate to the mounting area for the driver and connected to the flexible substrate side terminal area and the driver side terminal area, through which the signal is transmitted; and
a shield section, disposed to overlap the wire directly via an insulating film on the substrate section so as to be integrated with the substrate section, that is kept at a constant potential,
wherein the substrate section is mounted with a plurality of the drivers provided with a spacing from each other, and includes an inter-driver wire disposed to pass transversely across a space between mounting areas on the substrate section for the drivers that are adjacent to each other and connected to a driver side terminal area disposed in each of the mounting areas for the drivers that are adjacent to each other and an inter-driver shield section, disposed over the substrate section to overlap the inter-driver wire via an insulating film, that is kept at the constant potential.

2. The substrate according to claim 1, further comprising a constant-potential wire, disposed to extend from the mounting area on the substrate section for the flexible substrate to the mounting area for the driver, that is kept at the constant potential,
wherein
the driver side terminal area includes a constant-potential driver side terminal area connected to the constant-potential wire, and
the shield section is connected to the constant-potential driver side terminal area.

3. The substrate according to claim 2, wherein
the constant-potential wire is placed at the same layer as the wire, and
the shield section is disposed to overlap both the wire and the constant-potential wire via an insulating film.

4. The substrate according to claim 3, wherein
whereas the wire includes an electrical power system wire through which an electrical power system signal is transmitted as the signal and a control system wire through which a control system signal is transmitted as the signal, the constant-potential wire is placed adjacent to the electrical power system wire at a spacing from the electrical power system wire, and
the shield section is disposed to overlap at least both the electrical power system wire and the constant-potential wire via an insulating film.

5. The substrate according to claim 1, wherein
the substrate section includes a driver overlap wire placed at the same layer as the wire, disposed to overlap the driver, and connected to the driver side terminal area, and
the shield section is disposed to overlap both the wire and the driver overlap wire via an insulating film.

6. A display device comprising:
the substrate according to claim 1; and
a counter substrate placed opposite the substrate.

7. A substrate for a display device, the substrate comprising:
a substrate section on which a flexible substrate and a driver are mounted;

a flexible substrate side terminal area, disposed in a mounting area on the substrate section for the flexible substrate, to which a signal is inputted from the flexible substrate;

a driver side terminal area, disposed in a mounting area on the substrate section for the driver, through which at least a part of the signal is inputted and outputted to the driver;

a wire, disposed to extend from the mounting area on the substrate section for the flexible substrate to the mounting area for the driver and connected to the flexible substrate side terminal area and the driver side terminal area, through which the signal is transmitted; and a shield section, disposed to overlap the wire via an insulating film on the substrate section, that is kept at a constant potential, wherein the wire includes an electrical power system wire through which an electrical power system signal is transmitted as the signal and a control system wire through which a control system signal is transmitted as the signal, the shield section includes an electrical power system shield section disposed to overlap the electrical power system wire via an insulating film and a control system shield section disposed to overlap the control system wire via an insulating film and separated from the electrical power system shield section, wherein
the electrical power system wire and the control system wire are placed at the same layer as each other, and
the control system shield section is located closer to the control system wire in a direction of overlap than the electrical power system shield section is located in relation to the electrical power system wire in the direction of overlap.

8. The substrate according to claim 7, further comprising a constant-potential wire, disposed to extend from the mounting area on the substrate section for the flexible substrate to the mounting area for the driver, that is kept at the constant potential,
    wherein
    the driver side terminal area includes a constant-potential driver side terminal area connected to the constant-potential wire, and
    the shield section is connected to the constant-potential driver side terminal area.

9. The substrate according to claim 8, wherein
the constant-potential wire is placed at the same layer as the wire, and
the shield section is disposed to overlap both the wire and the constant-potential wire via an insulating film.

10. The substrate according to claim 9, wherein
whereas the wire includes an electrical power system wire through which an electrical power system signal is transmitted as the signal and a control system wire through which a control system signal is transmitted as the signal, the constant-potential wire is placed adjacent to the electrical power system wire at a spacing from the electrical power system wire, and
the shield section is disposed to overlap at least both the electrical power system wire and the constant-potential wire via an insulating film.

11. The substrate according to claim 7, wherein
the substrate section includes a driver overlap wire placed at the same layer as the wire, disposed to overlap the driver, and connected to the driver side terminal area, and the shield section is disposed to overlap both the wire and the driver overlap wire via an insulating film.

12. A display device comprising:
the substrate according to claim 7; and
a counter substrate placed opposite the substrate.

13. A substrate for a display device, the substrate comprising:
    a substrate section on which a flexible substrate and a driver are mounted;
    a flexible substrate side terminal area, disposed in a mounting area on the substrate section for the flexible substrate, to which a signal is inputted from the flexible substrate;
    a driver side terminal area, disposed in a mounting area on the substrate section for the driver, through which at least a part of the signal is inputted and outputted to the driver;
    a wire, disposed to extend from the mounting area on the substrate section for the flexible substrate to the mounting area for the driver and connected to the flexible substrate side terminal area and the driver side terminal area, through which the signal is transmitted; and
    a shield section, disposed to overlap the wire via an insulating film on the substrate section, that is kept at a constant potential,
wherein
    the substrate section is mounted with a gate driver that, as the driver, outputs at least a scanning signal by processing the signal and a source driver that, as the driver, outputs at least an image signal by processing the signal,
    the driver side terminal area includes a gate driver side terminal area disposed in a mounting area for the gate driver and a source driver side terminal area disposed in a mounting area for the source driver,
    the wire includes a gate driver side wire disposed to extend from the mounting area for the flexible substrate to the mounting area for the gate driver and connected to the flexible substrate side terminal area and the gate driver side terminal area and a source driver side wire disposed to extend from the mounting area for the flexible substrate to the mounting area for the source driver and connected to the flexible substrate side terminal area and the source driver side terminal area, and
    the shield section includes a gate driver side shield section disposed to overlap the gate driver side wire via an insulating film and a source driver shield section disposed to overlap the source driver side wire via an insulating film.

14. The substrate according to claim 13, further comprising a constant-potential wire, disposed to extend from the mounting area on the substrate section for the flexible substrate to the mounting area for the driver, that is kept at the constant potential,
    wherein
    the driver side terminal area includes a constant-potential driver side terminal area connected to the constant-potential wire, and
    the shield section is connected to the constant-potential driver side terminal area.

15. The substrate according to claim 14, wherein
the constant-potential wire is placed at the same layer as the wire, and
the shield section is disposed to overlap both the wire and the constant-potential wire via an insulating film.

16. The substrate according to claim 15, wherein
whereas the wire includes an electrical power system wire through which an electrical power system signal is transmitted as the signal and a control system wire through which a control system signal is transmitted as the signal, the constant-potential wire is placed adjacent to the electrical power system wire at a spacing from the electrical power system wire, and
the shield section is disposed to overlap at least both the electrical power system wire and the constant-potential wire via an insulating film.

17. The substrate according to claim 13, wherein
the substrate section includes a driver overlap wire placed at the same layer as the wire, disposed to overlap the driver, and connected to the driver side terminal area, and
the shield section is disposed to overlap both the wire and the driver overlap wire via an insulating film.

18. A display device comprising:
the substrate according to claim 13; and
a counter substrate placed opposite the substrate.

\* \* \* \* \*